(12) United States Patent
Yao et al.

(10) Patent No.: US 11,891,683 B2
(45) Date of Patent: Feb. 6, 2024

(54) THERMAL SHOCK SYNTHESIS OF MULTIELEMENT NANOPARTICLES

(71) Applicant: University of Maryland, College Park, College Park, MD (US)

(72) Inventors: Yonggang Yao, College Park, MD (US); Liangbing Hu, Potomac, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 17/526,332

(22) Filed: Nov. 15, 2021

(65) Prior Publication Data
US 2022/0074035 A1     Mar. 10, 2022

Related U.S. Application Data

(62) Division of application No. 16/203,223, filed on Nov. 28, 2018, now Pat. No. 11,193,191.
(Continued)

(51) Int. Cl.
*B22F 9/24*     (2006.01)
*C22F 1/00*     (2006.01)
(Continued)

(52) U.S. Cl.
CPC ............... *C22F 1/002* (2013.01); *B22F 9/24* (2013.01); *C22F 1/10* (2013.01); *C22F 1/14* (2013.01); *B82Y 30/00* (2013.01); *B82Y 40/00* (2013.01)

(58) Field of Classification Search
None
See application file for complete search history.

(56) References Cited

U.S. PATENT DOCUMENTS 5,110,565 A * 5/1992 Weimer ................ C01B 32/907
                                        422/198
5,749,937 A * 5/1998 Detering ................. H05H 1/34
                                        75/10.21
(Continued)

FOREIGN PATENT DOCUMENTS

CN        105157436 A   *   12/2015
EP         1413354 A1   *   4/2004

OTHER PUBLICATIONS

English translation of CN 105157436 (originally published Dec. 16, 2015) obtained from PE2E search.*
(Continued)

*Primary Examiner* — George Wyszomierski
(74) *Attorney, Agent, or Firm* — Rowantree Law Group, PLLC; Frederick F. Rosenberger

(57) ABSTRACT

A formation of multielement nanoparticles is disclosed that includes at least three elements. Each of the at least three elements is uniformly distributed within the multielement nanoparticles forming nanoparticles having a homogeneous mixing structure. At least five elements may form a high-entropy nanoparticle structure. A method for manufacturing a formation of multielement nanoparticles includes providing a precursor material composed of the at least three component elements in multielement nanoparticles; heating the precursor material to a temperature and a time; and quenching the precursor to a temperature at a cooling rate to result in a formation of multielement nanoparticles containing at least three elements and the heating and the quenching representing a multielement nanoparticle thermal shock formation process. A corresponding system for manufacturing the formation of multielement nanoparticles and a method of using the multielement nanoparticles are also disclosed.

18 Claims, 32 Drawing Sheets
(25 of 32 Drawing Sheet(s) Filed in Color)

Related U.S. Application Data

(60) Provisional application No. 62/631,889, filed on Feb. 18, 2018, provisional application No. 62/591,638, filed on Nov. 28, 2017.

(51) Int. Cl.
  *C22F 1/14* (2006.01)
  *C22F 1/10* (2006.01)
  *B82Y 30/00* (2011.01)
  *B82Y 40/00* (2011.01)

(56) References Cited

U.S. PATENT DOCUMENTS

| | | | |
|---|---|---|---|
| 2003/0019218 A1* | 1/2003 | Hofmann | F25B 9/145 62/6 |
| 2007/0036709 A1 | 2/2007 | Lashmore et al. | |
| 2007/0206654 A1* | 9/2007 | Merzliakov | G01K 17/006 374/E17.003 |
| 2009/0277897 A1 | 11/2009 | Lashmore et al. | |
| 2011/0143933 A1 | 6/2011 | Yin et al. | |
| 2011/0147358 A1* | 6/2011 | Kober | B66B 11/0226 219/202 |
| 2011/0189394 A1 | 8/2011 | Noda et al. | |
| 2013/0053239 A1 | 2/2013 | Carpenter | |
| 2014/0186550 A1 | 7/2014 | Cooper et al. | |
| 2018/0186955 A1 | 7/2018 | Odeh et al. | |
| 2018/0291534 A1 | 10/2018 | Joo et al. | |
| 2018/0369771 A1 | 12/2018 | Hu et al. | |
| 2022/0241756 A1* | 8/2022 | Hu | B01J 19/126 |
| 2023/0149981 A1 | 5/2023 | Shiraishi et al. | |

OTHER PUBLICATIONS

Notice of Allowance, dated Jul. 23, 2021 (Jul. 23, 2021), in parent U.S. Appl. No. 16/203,223. (7 pages).

Office Action, dated Aug. 25, 2020 (Aug. 25, 2020), in parent U.S. Appl. No. 16/203,223. (9 pages).

Office Action, dated Dec. 8, 2020 (Dec. 8, 2020), in parent U.S. Appl. No. 16/203,223. (10 pages).

Office Action, dated Apr. 28, 2021 (Apr. 28, 2021), in parent U.S. Appl. No. 16/203,223. (8 pages).

Chen et al., Polyelemental nanoparticle libraries, Science, 352, 1565-1569 (2016).

Bu et al., Biaxially strained PtPb/Pt core/shell nanoplate boosts oxygen reduction catalysis, Science, 354, 1410-1414 (2016).

Kwon et al., Heterogeneous nucleation and shape transformation of multicomponent metallic nanostructures, Nat. Mater., 14, 215-23 (2015).

Takashi et al., Finely controlled multimetallic nanocluster catalysts for solvent-free aerobic oxidation of hydrocarbons, Sci. Adv., 3, e1700101 (2017).

Buck et al., A total-synthesis framework for the construction of high-order colloidal hybrid nanoparticles, Nat. Chem, 4, 37-44 (2011).

Cortie et al., Synthesis and optical properties of hybrid and alloy plasmonic nanoparticles, Chem. Rev., 111, 3713-3735 (2011).

Gilroy et al., Bimetallic Nanocrystals: Syntheses, Properties, and Applications, Chem. Rev. 116, 10414-10472 (2016).

Chen et al., Tip-Directed Synthesis of Multimetallic Nanoparticles, J. Am. Chem. Soc., 137, 9167-9173 (2015).

Chen et al., Structural Evolution of Three-Component Nanoparticles in Polymer Nanoreactors, J. Am. Chem. Soc., 139, 9876-9884 (2017).

Yeh et al., Nanostructured High-Entropy Alloys with Multiple Principal Elements: Novel Alloy Design Concepts and Outcomes, Adv. Eng. Mater., 6, 299-303 (2004).

Ye et al., High-entropy alloy: challenges and prospects, Mater. Today, 19, 349-362 (2016).

Xin et al., Pt—Rh—Pd Alloy Group Gauze Catalysts Used for Ammonia Oxidation, Rare Met. Mater. Eng., 46, 339-343 (2017).

Bagot et al., Oxidation and Surface Segregation Behavior of a Pt—Pd—Rh Alloy Catalyst, J. Phys. Chem. C., 118, 26130-26138 (2014).

Yao et al., Carbothermal shock synthesis of high-entropy-alloy nanoparticles, Science, vol. 359, Issue 6383, pp. 1489-1494 (2018).

Chen et al., Interface and Heterostructure Design in Polyelemental Nanoparticles, Science, 363, 959-964 (2019).

Kluender et al., Catalyst Discovery through Megalibraries of Nanomaterials., Proc. Natl. Acad. Sci., 116, 40-45 (2019).

Batchelor et al., High-Entropy Alloys as a Discovery Platform for Electrocatalysis, Joule, 3, 1-12 (2019).

Löffler et al., Discovery of a Multinary Noble Metal-Free Oxygen Reduction Catalyst, Adv. Energy Mater., 8, 1802269 (2018).

Ding et al., A General Synthesis Approach for Supported Bimetallic Nanoparticles via Surface Inorganometallic Chemistry, Science, 362, 560-564 (2018).

Erini, N. et al., "Ethanol Electro-Oxidation on Ternary Platinum-Rhodium-Tin Nanocatalysts: Insights in the Atomic 3D Structure of the Active Catalytic Phase", ACS Catalysis, vol. 4, pp. 1859-1867, Apr. 25, 2014.

Wei, H, et al., "Investigation of Structural, Thermal, and Dynamical Properties of Pd—Au—Pt Ternary Metal Nanoparticles Confined in Carbon Nanotubes Based on MD Simulation", Journal of Physical Chemistry C, vol. 121, pp. 12911-12920, May 30, 2017.

\* cited by examiner

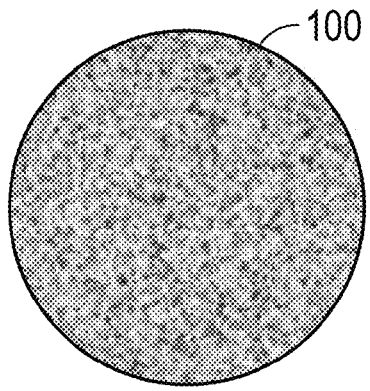

FIG. 1A

Multielement nanoparticles
- Nanoparticles (<1 μm)
- At least three elements
- Homogeneous mixing of the at least three elements within the nanoparticles

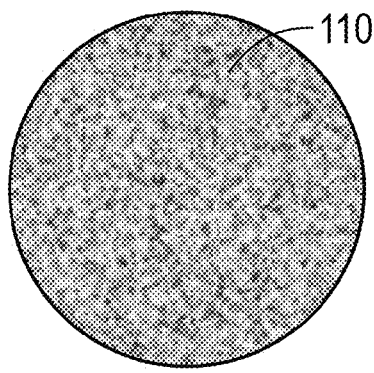

FIG. 1B

High entropy alloy nanoparticles
- Nanoparticles (<1 μm)
- At least five elements
- Homogeneous mixing of the at least five elements within the nanoparticles

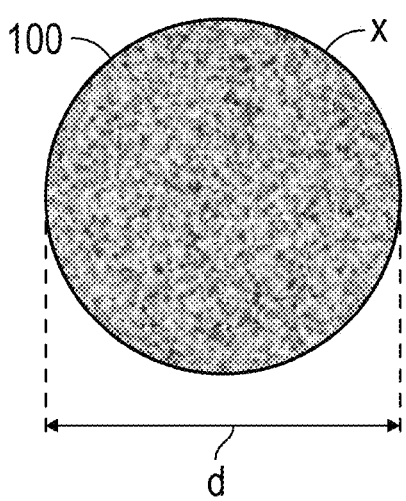

FIG. 2

Size d,
- From few atoms to at least 1 μm
- Any shape

Composition x,
- The at least three elements are metallic elements forming homogeneous alloys, or
- The at least three elements are metallic elements and form homogeneous compounds with non-metal elements

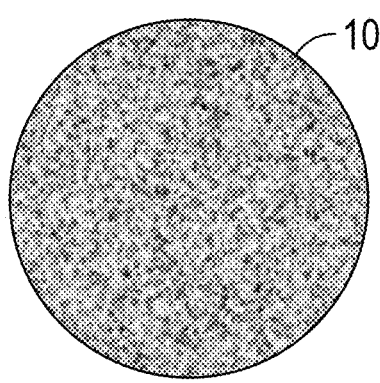

Starting material:
- Can be precursor salts
- Can be corresponding bulk materials
- Or combination thereof

FIG. 5A

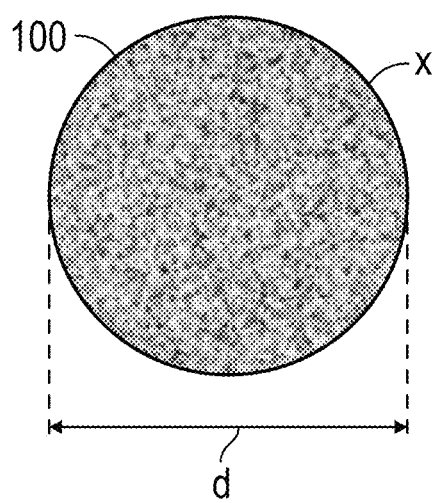

Size d,
- From few atoms to at least 1 μm
- Any shape

Composition x, at least three elements
- The at least three elements are metallic elements forming homogeneous alloys, or
- The at least three elements are metallic elements and form homogeneous compounds with non-metal elements

FIG. 5B

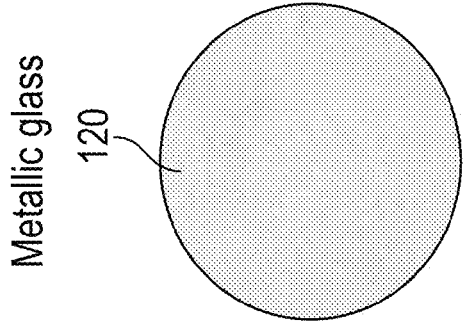
FIG. 6A Homogeneous mixing
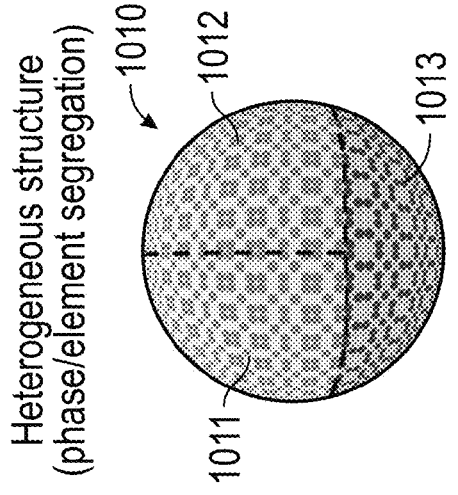
FIG. 6B Heterogeneous structure (phase/element segregation)
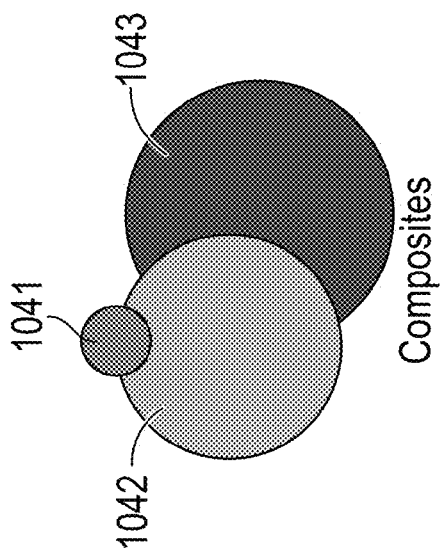
FIG. 6C Metallic glass
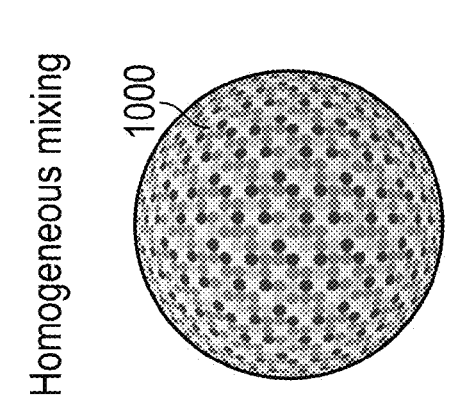
Special heterogeneous structures
FIG. 6D Core-Shell structure / Multilayer core-shell structure
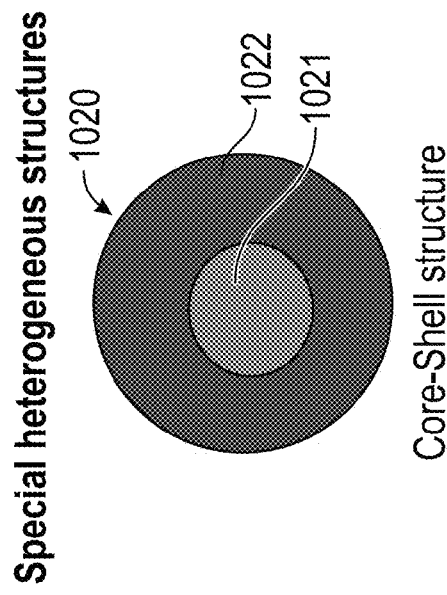
Composites Unary (Pt, Au, Fe)
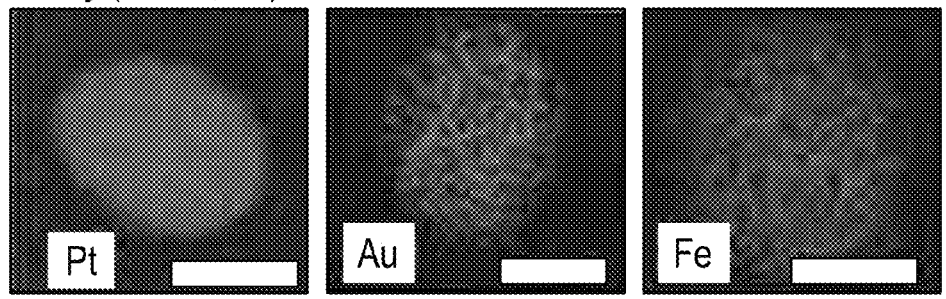
FIG. 7B1
Binary (PtNi, AuCu, FeNi)
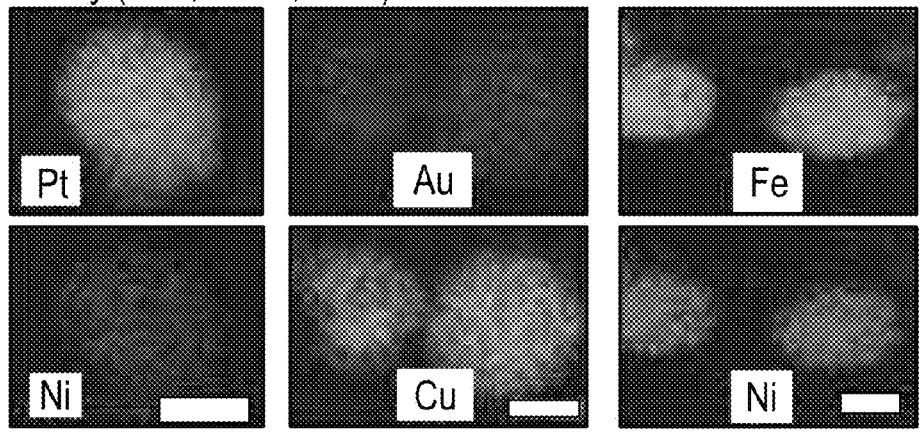
FIG. 7B2
Ternary (PtPdNi, AuCuSn, FeCoNi)
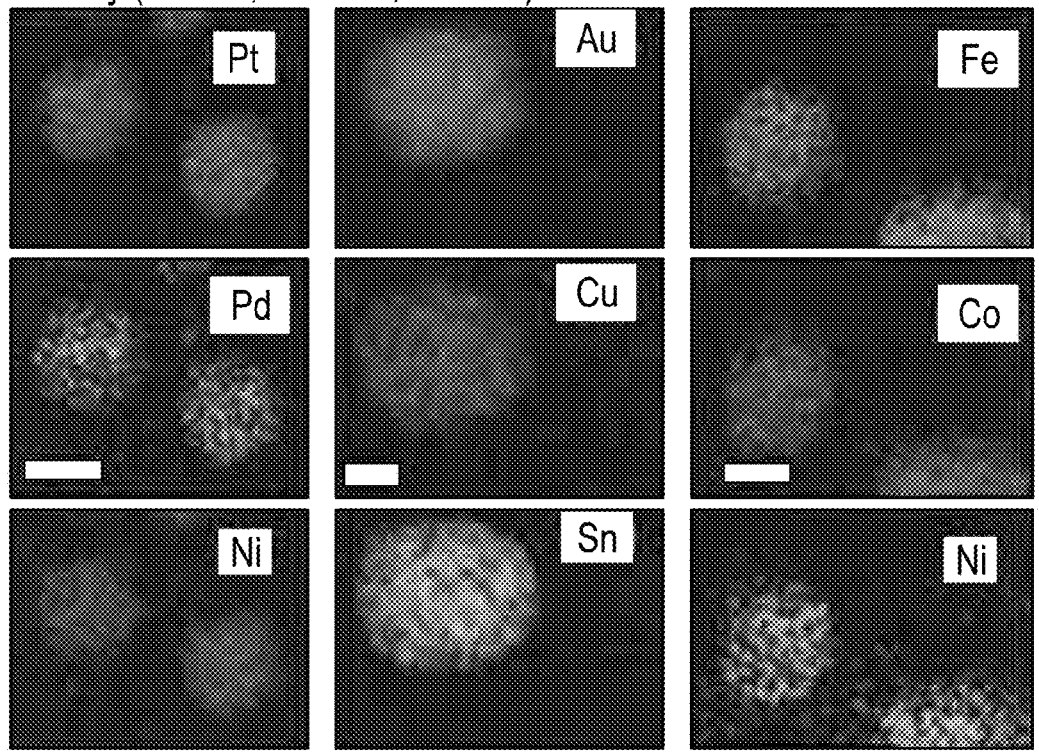
FIG. 7B3

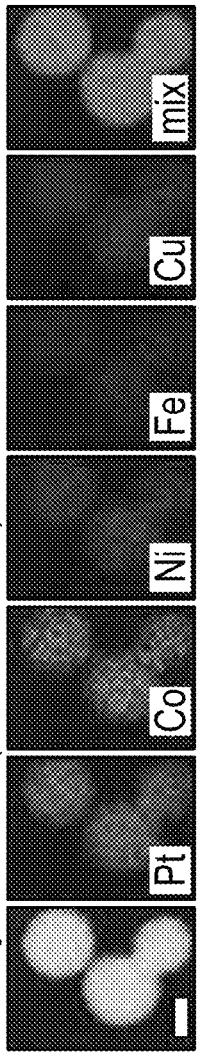
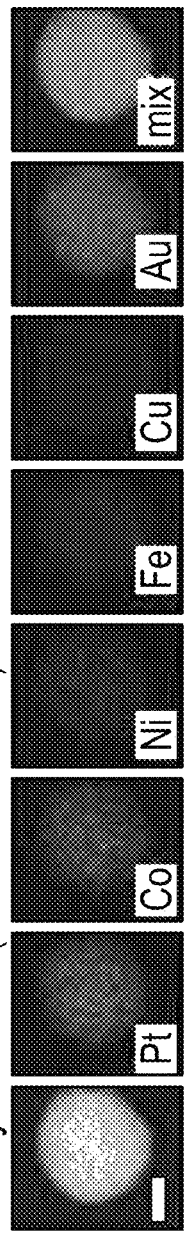
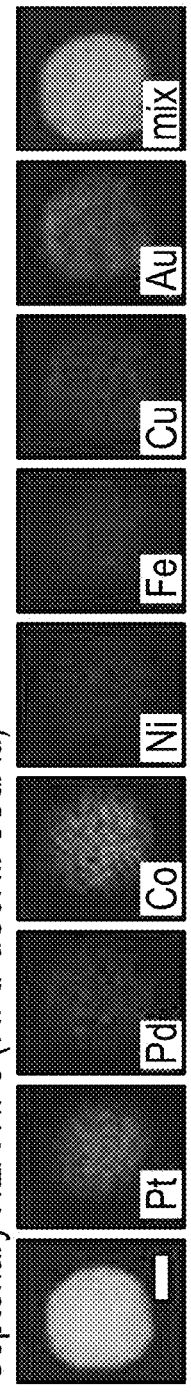
FIG. 7C1 Quinary HEA-NPs (5:PtCoNiFeCu)
FIG. 7C2 Quinary HEA-NPs (5:PtPdCoNiFe)
FIG. 7C3 Senary HEA-NPs (6:PtCoNiFeCuAu)
FIG. 7C4 Septenary HEA-NPs (7:PtPdCoNiFeCuAu)

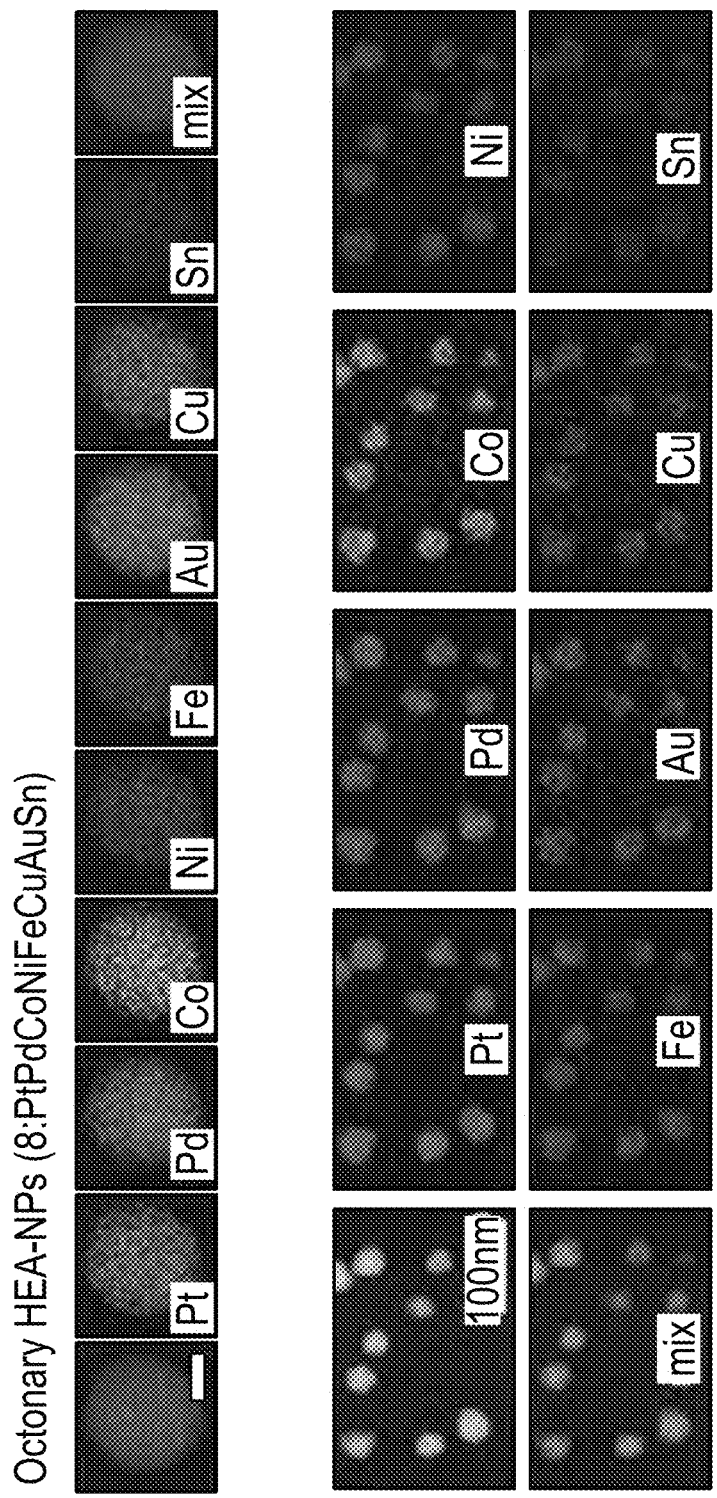
FIG. 7D1

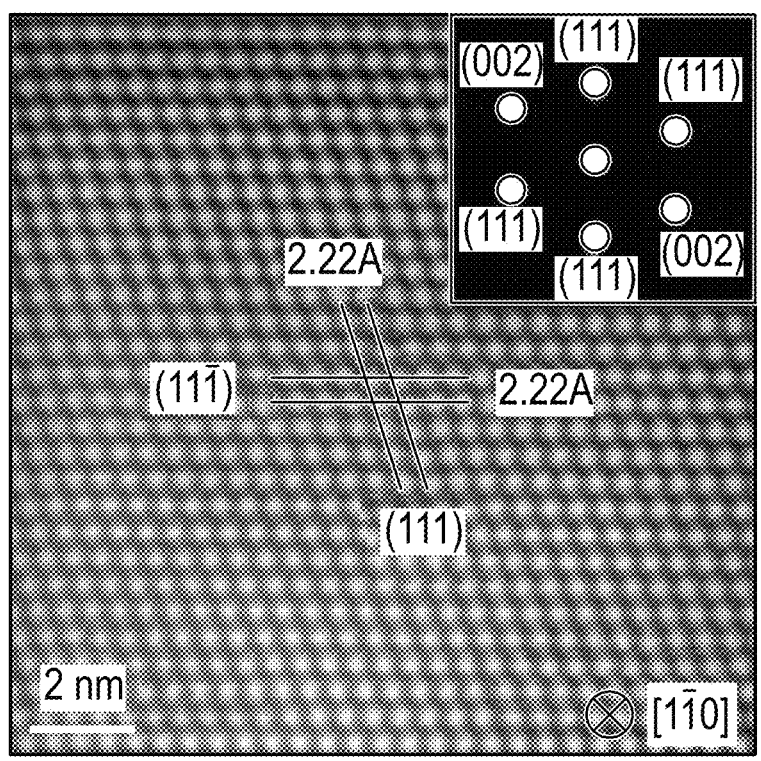
FIG. 7D2

Flow-through synthesis
High temperature channels

400
401
410a...410n
402
15
A
Precursors in
100',110'
Nanoparticles out

452 — Form precursors as an aerosol spray

454 — Spray aerosol into aerosol heating chamber

456 — Heat precursors in aerosol heating chamber to become multi-element nanoparticles or high-entropy nanoparticles 458 — Quench multi-element nanoparticles or high-entropy nanoparticles at a selected cooling rate to become a homogeneous mixture or a phase/element separated heterogeneous structure

FIG. 8B

Conductive heating

Microwave heating

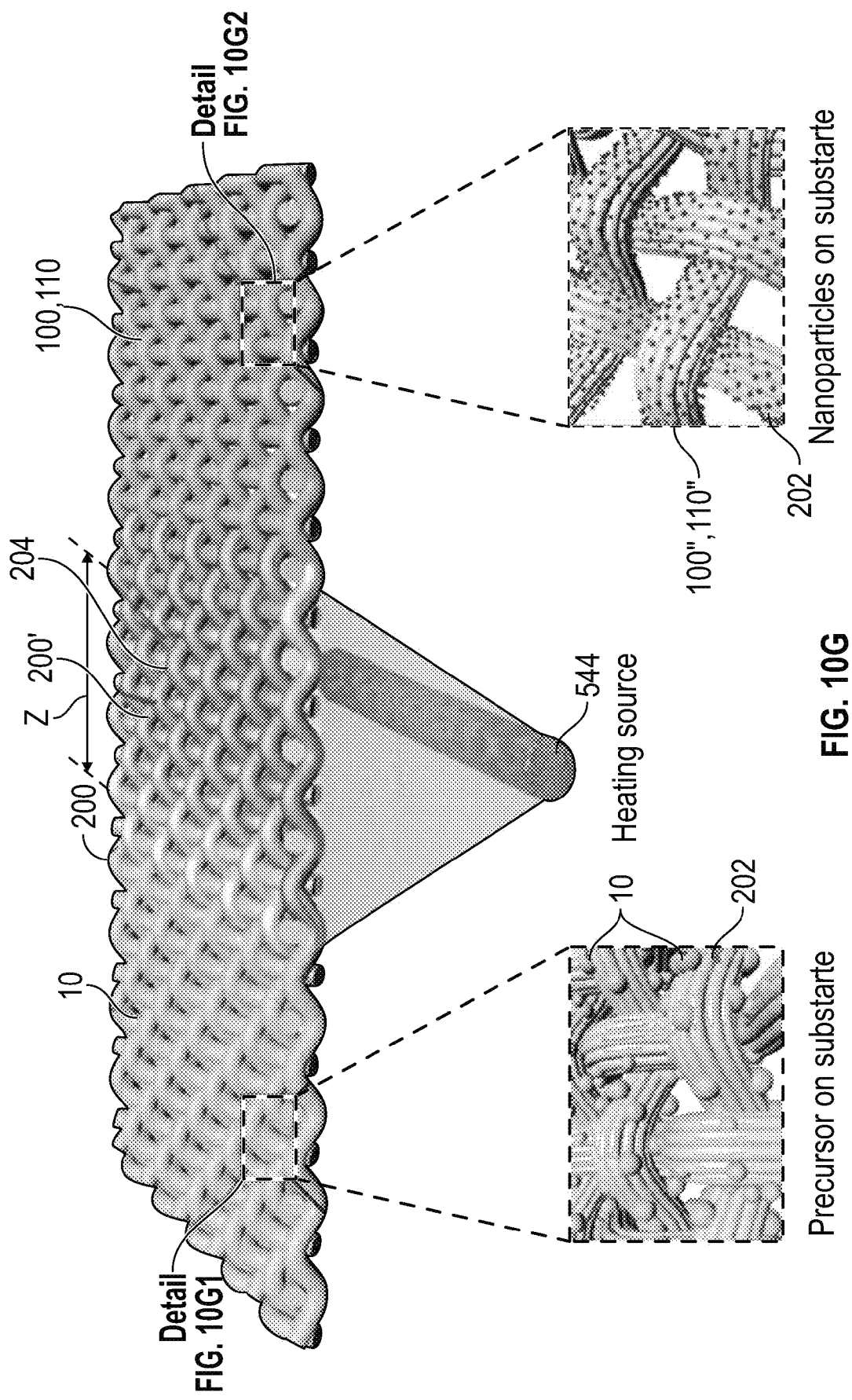

Multiple shock

Multilayer structure

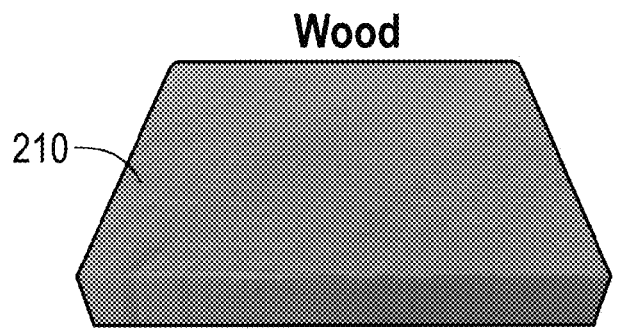
FIG. 19A1
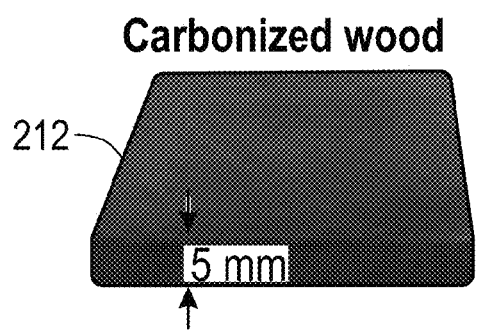
FIG. 19A2
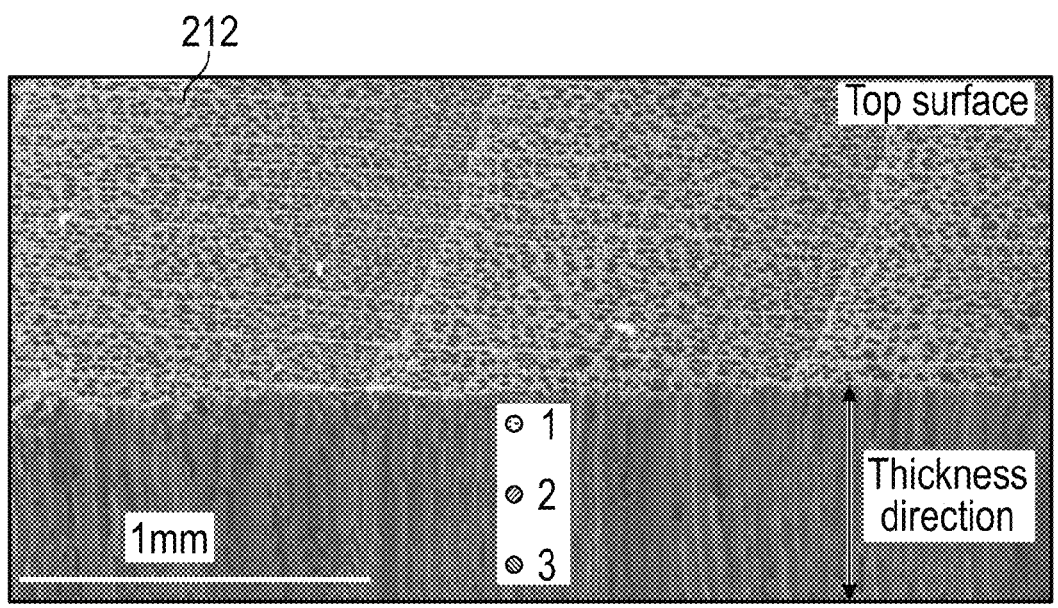
FIG. 19A3

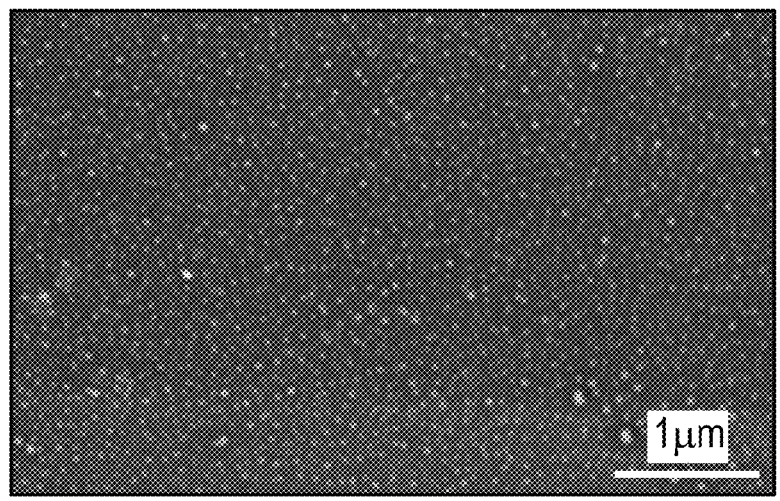
FIG. 19B1
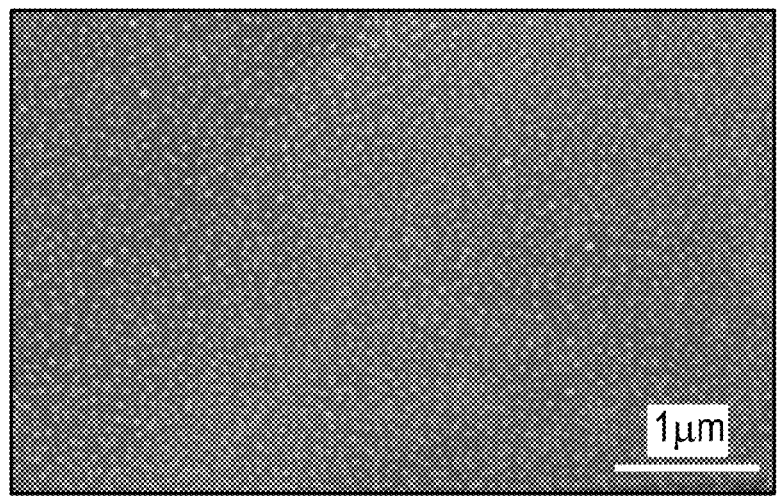
FIG. 19B2
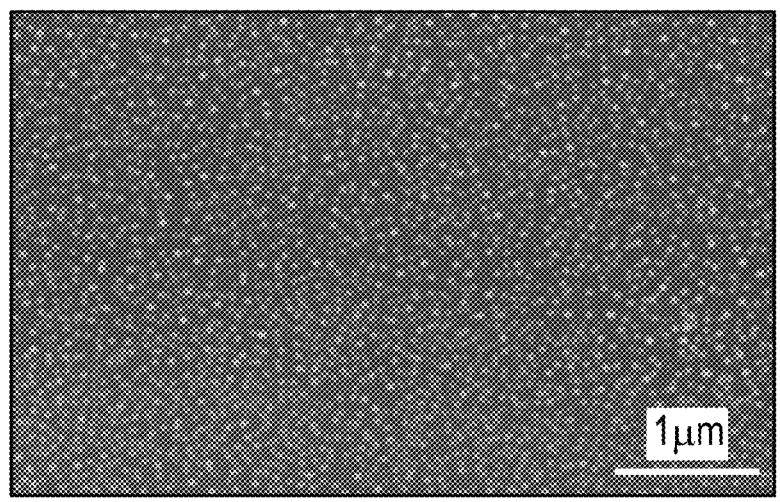
FIG. 19B3

Shock synthesis and process
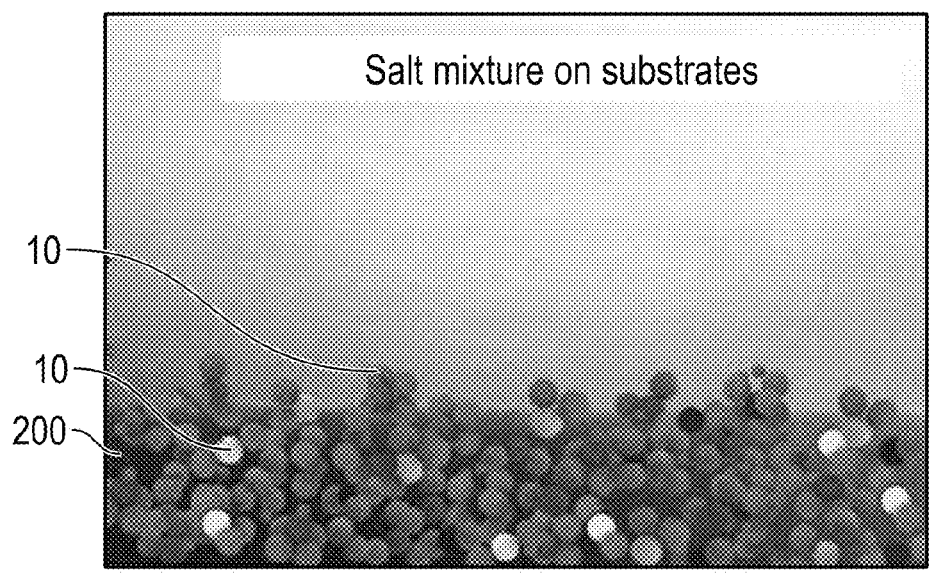
FIG. 20A1
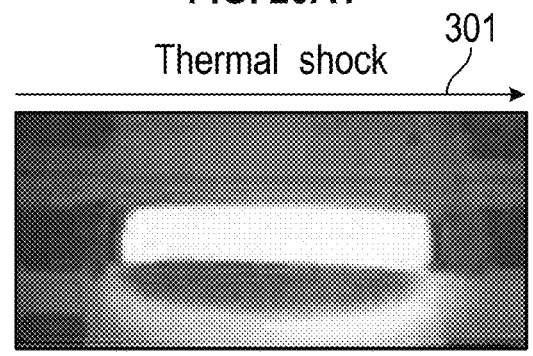
FIG. 20A2
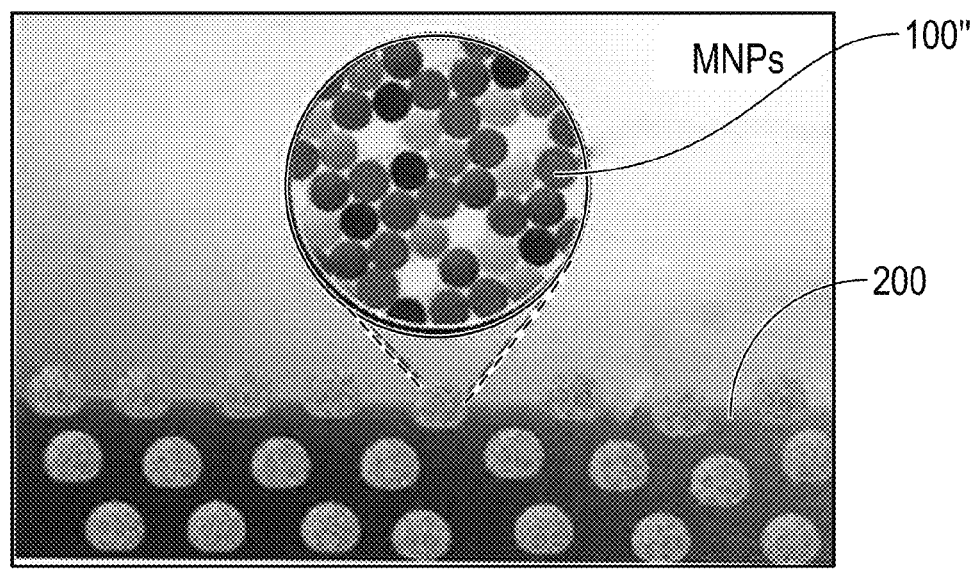
FIG. 20A3

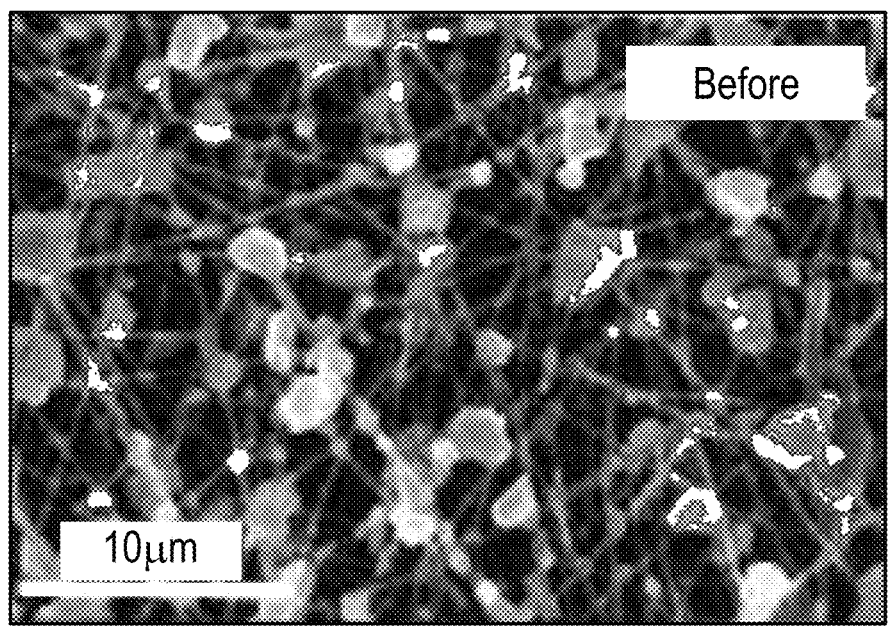
FIG. 20B1
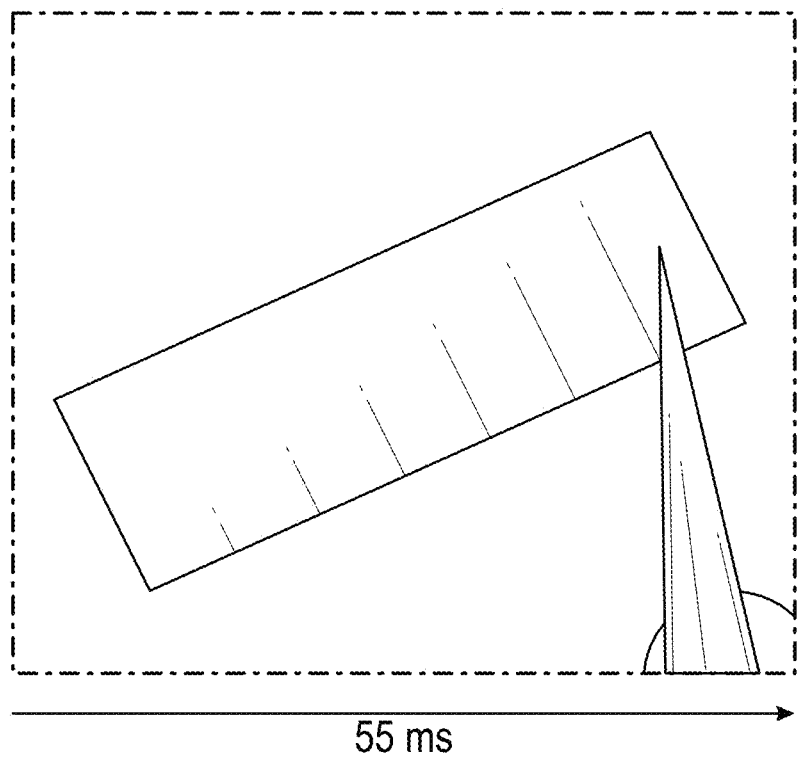
FIG. 20B2

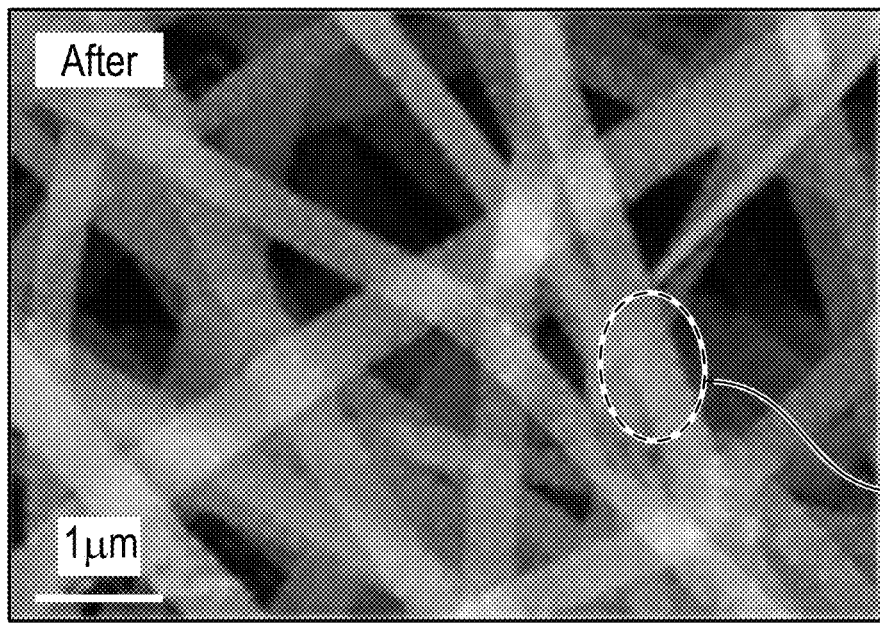
FIG. 20B3
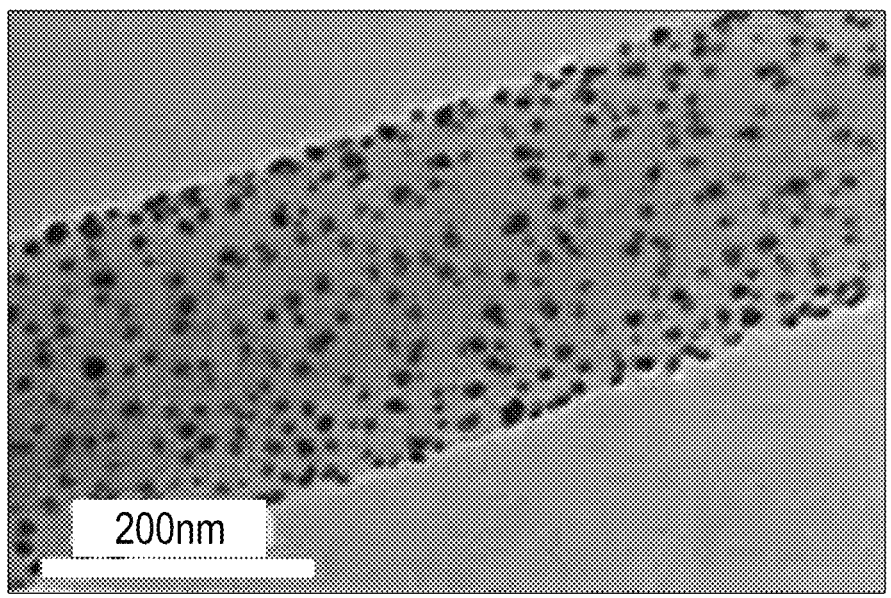
FIG. 20B4

THERMAL SHOCK SYNTHESIS OF MULTIELEMENT NANOPARTICLES

CROSS-REFERENCE TO RELATED APPLICATIONS

This application is a divisional of U.S. patent application Ser. No. 16/203,223, now U.S. Pat. No. 11,193,191, which claims the benefit of and priority to U.S. Provisional Patent Application No. 62/591,638 filed on Nov. 28, 2017, and U.S. Provisional Patent Application No. 62/631,889 filed on Feb. 18, 2018, the entire contents of which are incorporated by reference herein.

BACKGROUND

1. Technical Field

The disclosure relates to the field of multielement nanoparticles and more particularly the field of forming and manufacturing multielement nanoparticles.

2. Description of Related Art

The controllable incorporation of multiple immiscible elements into a single nanoparticle merits untold scientific and technological potential, yet remains a challenge using conventional synthetic techniques.

Multielement nanoparticles (MENPs) are of interest in a wide range of applications including catalysis (1-7), energy storage (8), bio/plasmonic imaging (8, 9), among others. Alloying multiple metallic elements into individual nanoscale products offers the promise of material properties that could exceed single element nanoparticles (2, 5, 6). The current and primary approaches towards the preparation of MENPs arise from wet chemistry synthesis, where a variety of particle sizes, shapes, and phases can be attained (3, 4, 7, 10). However, most reports via wet chemical methods report alloy compositions not exceeding three elements, which limits the compositional space of multicomponent nanomaterials. Additionally, more site-specific synthesis techniques including printing- and lithography-based methods (1, 11, 12), have shifted the compositional space towards quaternary and even quinary nanostructures however, the subsequent reduction procedures tend to limit the structural complexity to phase-separated MENPs, especially for immiscible elemental combinations (1, 12, 13). In terms of bulk material synthesis, melt processing is a scalable method that has led to the creation of homogeneous high entropy alloys (HEAs) consisting of five or more elements in a solid solution (uniform mixing), which has shown great potential as structural materials (14-18). To date, only a limited family of HEAs have been achieved, due to the difficulty of mixing elements with vastly different chemical and physical properties as well as cooling rate constraints. Moreover, downsizing HEAs to the nanoscale is a daunting task, especially by conventional alloying methods.

SUMMARY

The embodiments of the present disclosure provide significant and non-obvious advantages over the prior art by providing, the present disclosure relates to a formation of multielement nanoparticles that include at least three elements, wherein each of the at least three elements is uniformly distributed within the multielement nanoparticles. The at least three elements are uniformly distributed within the multielement nanoparticles forming thereby nanoparticles having a homogeneous mixing structure and the at least three elements each represent a respective atom having a particle size dimension.

In an aspect, the at least three elements of the formation of multielement nanoparticles may include at least five elements, and the at least five elements are uniformly distributed within the multielement nanoparticles forming thereby high-entropy nanoparticles as the formation of multielement nanoparticles, the at least five elements each representing a respective atom having a particle size dimension.

In an aspect, particle size of the at least three elements forming the multielement nanoparticles ranges from a sum of the particle size dimensions of the respective atoms represented by the at least three elements to at least 1 micrometer.

In an aspect, the at least three elements are metallic elements in Groups 1-15 of the Periodic Table of the Elements and formed into an alloy of the at least three elements.

In an aspect, the at least three elements are metallic elements in Groups 1-15 of the Periodic Table of the Elements and formed as one of compounds or composites with non-metal elements in Groups 13-16 of the Periodic Table of the Elements The present disclosure relates also to a method for manufacturing a formation of multielement nanoparticles that includes providing a precursor material of at least three component elements; heating the precursor material to a temperature and for a time duration; and quenching the precursor that has been heated to the temperature and for the time duration to a temperature at a cooling rate, wherein the heating of the precursor to a temperature and for a time duration and the quenching of the precursor that has been heated to the temperature and for the time duration to a temperature at a cooling rate result in a formation of multielement nanoparticles containing, as final multielement nanoparticles, at least the at least three component elements of the precursor material, the heating and the quenching representing thereby a multielement nanoparticle thermal shock formation process.

In an aspect, the heating of the precursor may include heating the precursor to a temperature range of 500 Kelvins (K)-3000 Kelvins (K) and for a time duration of 1 millisecond to 1 minute and the quenching of the precursor may include quenching the precursor to a temperature of 100 K to 500 K at a cooling rate of 10 Kelvins/second to 10E+6 Kelvins/second.

In an aspect, the step of providing a precursor material composed of at least three component elements may include providing the precursor material to include at least solution-based salt precursors composed of the at least three component elements in the final multielement nanoparticles, or bulk materials having a size greater than 1 micron (1 μm) and containing at least the at least three component elements in the final multielement nanoparticles.

In an aspect, the step of providing a precursor material composed of at least three component elements may include depositing uniformly a precursor on a substrate; heating the precursor-loaded substrate to a temperature ranging from 500 K to 3000 K for a time duration ranging from 1 millisecond to 1 minute; and quenching the precursor-based substrate to a temperature from 100-300 K at a rate ranging from 10 K/second to 10E+6 K/second.

In an aspect, the formation of multielement nanoparticles containing at least three elements is of multielement nanoparticles with the at least three elements having a particle size ranging from at least three atoms to 1 micrometer.

In an aspect, the formation of multielement nanoparticles containing at least three elements is of at least three elements that are metallic elements in Groups 1-15 of the Periodic Table of the Elements and formed into an alloy of the at least three elements, forming thereby multielement nanoparticles.

In an aspect, the formation of multielement nanoparticles containing at least three elements is of at least three elements that are metallic elements in Groups 1-15 of the Periodic Table of the Elements and formed as one of compounds or composites with non-metal elements in Groups 13-16 of the Periodic Table of the Elements, forming thereby the multielement nanoparticles.

In an aspect, the formation of multielement nanoparticles containing at least three elements is of multielement nanoparticles with at least three elements that are one of the group consisting of a homogeneous mixing structure, or a phase/element separated heterogeneous structure, or a metallic glass, or a core-shell structure, or a metallic glass structure, or a composite structure or combinations thereof.

In an aspect, the formation of multielement nanoparticles containing at least three elements is of multielement nanoparticles that are one of aggregated nanoparticles, or nanoparticles supported on a substrate.

In an aspect, the formation of multielement nanoparticles supported on a substrate is of multielement nanoparticles supported on a substrate that is formed of one of at least one carbon-based material, at least one metal, at least one semiconductor, at least one polymer-based material and at least one ceramic or combinations of at least one carbon-based material, at least one metal, at least one semiconductor, at least one polymer-based material, and at least one ceramic.

In an aspect, the heating and quenching in a shock pulsing manner is performed by one of direct Joule heating, or radiative heating, or conductive heating, or microwave heating, or laser heating, or plasma heating.

In an aspect, the quenching in a shock pulsing manner is performed at low temperature from 100K to 500K.

In an aspect, the thermal shock process is performed in an environment that is one of a vacuum or an inert atmosphere or a reactive atmosphere.

In an aspect, the multielement thermal shock formation process is repeated at least once.

In an aspect, additional precursor material is applied to the multielement nanoparticles produced by the thermal shock and wherein the thermal shock process is repeated at least another time to form a heterogeneous multi-layer structure.

In an aspect, prior to the step of coating uniformly a solution-based salt precursor on a substrate, the method includes distributing the substrate from a first rotational storage structure to a solution storage container; coating uniformly a solution-based salt precursor on the substrate by immersing the substrate in the solution storage container; heating the salt precursor solution-based substrate to a temperature ranging from 500 K to 3000 K for a time duration ranging from 1 millisecond to 1 minute; and quenching the precursor-loaded substrate at a rate ranging from 10 K/second to 10E+6 K/second by transferring the precursor-loaded substrate to a second rotational storage structure configured to receive the precursor-loaded substrate at a speed sufficient to enable the quenching at a cooling rate result in a formation of multielement nanoparticles from at least three elements.

The present disclosure relates also to a system for manufacturing a formation of multielement nanoparticles that includes a heating chamber enabling heating a precursor to a temperature and for a time duration; the heating chamber configured to enable quenching the salt precursor that has been heated to the temperature and for the time duration at a cooling rate, wherein the heating of the precursor to a temperature and for a time duration and the quenching of the precursor that has been heated to the temperature and for the time duration at a cooling rate result in a formation of multielement nanoparticles from at least three elements, the heating and the quenching enabled by the heating chamber enabling thereby a multielement nanoparticle thermal shock formation process to be executed by the system.

In an aspect, the heating chamber is a heating vessel configured to receive a plurality of precursor particles at an inlet portion of the heating chamber, wherein the heating vessel forms an internal volume of space which contains therein a plurality of high-temperature heating channels, the precursors injected into the heating vessel being heated to a temperature for a time duration after which the now transformed precursors, as one of multielement nanoparticles or high-entropy nanoparticles, exit the heating vessel and are quenched or cooled at a rate sufficient to result in a formation of multielement nanoparticles from at least three elements.

In an aspect, the method further includes means for applying a uniform coating of a solution-based salt precursor on a substrate, wherein the heating chamber is configured to receive the uniformly coated solution-based salt precursor on a substrate.

In an aspect, the substrate is distributed from a first rotational storage structure to a solution storage container such that the precursor is deposited on a surface of the substrate.

In an aspect, the substrate having the implanted precursor is transferred to a third rotational element such that the system includes coating uniformly a solution-based precursor on the substrate by enabling immersing the substrate in the solution storage container.

In an aspect, the substrate and precursor are transferred to a drying vessel to reduce moisture content of the substrate and precursor.

In an aspect, the substrate and precursor are transferred to a heating chamber wherein the uniformly coated substrate is heated to a temperature $T_{max}$ ranging from 500 K to 3000 K for a time duration $t_s$ ranging from 5 milliseconds to 55 milliseconds or from 1 millisecond to 1 second wherein the transformation of the precursor to a plurality of multielement nanoparticles or a plurality of high-entropy nanoparticles occurs.

In an aspect, motion of the substrate and the transformed precursor from the heating vessel causes the quenching such that the multielement nanoparticles are formed into a heterogeneous structure or a homogeneous structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned advantages and other advantages will become more apparent from the following detailed description of the various exemplary embodiments of the present disclosure with reference to the drawings wherein:

FIG. 1A illustrates a multielement nanoparticle according to the present disclosure;

FIG. 1B illustrates a high-entropy nanoparticle according to the present disclosure includes at least five elements and there is homogenous mixing of the five or more elements within the nanoparticles;

FIG. 2 illustrates three or more elements in multielement nanoparticles are metallic elements forming homogeneous alloys or are metallic elements forming homogeneous compounds with non-metal elements;

FIG. 5A illustrates a precursor material may be precursor salts, or corresponding bulk materials or combinations thereof;

FIG. 5B illustrates a multielement nanoparticle having a size or average diameter is formed having a composition of at least three elements;

FIG. 6A illustrates a condition of homogenous mixing of a high-entropy nanoparticle;

FIG. 6B illustrates a heterogeneous structure of phase and/or element segregation for a multielement nanoparticle;

FIG. 6C illustrates a metallic glass formed at a faster quenching or cooling rate;

FIG. 6D illustrates on the left portion of the figure a core-shell structure for multielement nanoparticle wherein the core-shell structure includes a core surrounded by a shell, in the center portion, a multi-layer core-shell structure; and on the right portion of a composite structure for the multielement nanoparticle;

FIG. 7B1 illustrates scanning transmission electron microscopy (STEM) elemental maps of unary (Pt, Au, Fe) nanoparticles;

FIG. 7B2 illustrates scanning transmission electron microscopy (STEM) elemental maps of binary (PtNi, AuCu, FeNi) nanoparticles;

FIG. 7B3 illustrates scanning transmission electron microscopy (STEM) elemental maps of ternary (PtPdNi, AuCuSn, FeCoNi) multielement nanoparticles;

FIG. 7C1 illustrates a high angle annular dark-field (HAADF) images and atomic maps and images and STEM elemental maps of high entropy nanoparticles that are quinary (PtFeCoNiCu);

FIG. 7C2 illustrates a high angle annular dark-field (HAADF) images and atomic maps and images and elemental maps of high entropy nanoparticles that are also quinary (PtPdCoNiFe);

FIG. 7C3 illustrates a high angle annular dark-field (HAADF) images and atomic maps and images and elemental maps of high entropy nanoparticles that are senary (PtCoNiFeCuAu);

FIG. 7C4 illustrates a high angle annular dark-field (HAADF) images and atomic maps and images and elemental maps of high entropy nanoparticles that are septenary (PtPdCoNiFeCuAu);

FIG. 7D1 illustrates Individual and low magnification elemental maps of octonary (PtPdCoNiFeCuAuSn) high entropy nanoparticles;

FIG. 7D2 illustrates a high-resolution HAADF image with Fast Fourier Transform (FFT) analysis of the octonary (PtPdCoNiFeCuAuSn) high entropy nanoparticles;

FIG. 8A illustrates an aspect of the present disclosure of a system for manufacturing a formation of multielement nanoparticles;

FIG. 8B illustrates a method diagram for manufacturing a formation of nanoparticles via an aerosol spray of precursors as described above and shown in FIG. 8A;

FIG. 10G illustrates a detailed view of heating of the precursor coated or loaded substrate wherein a radiative heating source is positioned beneath precursor coated or loaded substrate wherein heating occurs in a central zone extending over the region;

FIG. 10G1 illustrates a detailed view of the surface of the substrate showing strands of the substrate and the precursor positioned on the strands;

FIG. 10G2 illustrates a detailed view of the surface of the substrate showing strands of the substrate and the now transformed precursor positioned on the strands as multi-element nanoparticles or high-entropy nanoparticles;

FIGS. 19A1-19A3 are photographs of carbonized wood as a 3D substrate to increase the nanoparticle production of the thermal shock methods;

FIG. 19A1 is a digital image of wood;

FIG. 19A2 is a digital image of carbonized wood;

FIG. 19A3 is a scanning electron microscopy (SEM) image of the carbonized wood;

FIG. 19B1 is an SEM image of uniformly distributed quinary high entropy nanoparticles (PtPdRhRuCe) at location 1 of the 3D substrate as noted in FIG. 19A3;

FIG. 19B2 is an SEM image of uniformly distributed quinary high entropy nanoparticles (PtPdRhRuCe) at location 2 of the 3D substrate as noted in FIG. 19A3;

FIG. 19B3 is an SEM image of uniformly distributed quinary high entropy nanoparticles (PtPdRhRuCe) at location 3 of the 3D substrate as noted in FIG. 19A3;

FIG. 20A1 illustrates the precursor salt mixture on a substrate;

FIG. 20A2 illustrates the thermal shock applied to the substrate and the precursor salt mixture;

FIG. 20A3 illustrates the multielement nanoparticles formed after the thermal shock;

FIG. 20B1 illustrates the salt precursor loaded carbon nanofiber film.

FIG. 20B2 illustrates the picture of the film;

FIG. 20B3 illustrates the SEM image of the uniformly distributed nanoparticles after the thermal shock process;

FIG. 20B4 illustrates transmission electron microscopy (TEM) images of the uniformly distributed nanoparticles after the thermal shock process;

FIG. 21A illustrates the reaction scheme for the ammonia oxidation process as well as the structural and performance differences between the PtPdRhRuCe high entropy alloy nanoparticles (HEA-NPs) synthesized by the thermal shock method according to the present disclosure and a control sample (PtPdRhRuCe mutlimetallic nanopaticles (MMNPs)) by wet impregnation;

FIG. 21B illustrates temperature-dependent product distribution and conversion of $NH_3$ for PtPdRhRuCe HEA-NPs;

FIG. 21C illustrates temperature-dependent product distribution and conversion of $NH_3$ for PtPdRhRuCe HEA-NPs and PtPdRhRuCe MMNPs;

FIG. 21D illustrates STEM elemental maps for PtPdRhRuCe HEA-NPs; and

FIG. 21E illustrates the time-dependent catalytic performance of PtPdRhRuCe HEA-NPs at 700° C.

DETAILED DESCRIPTION

Figure 3:
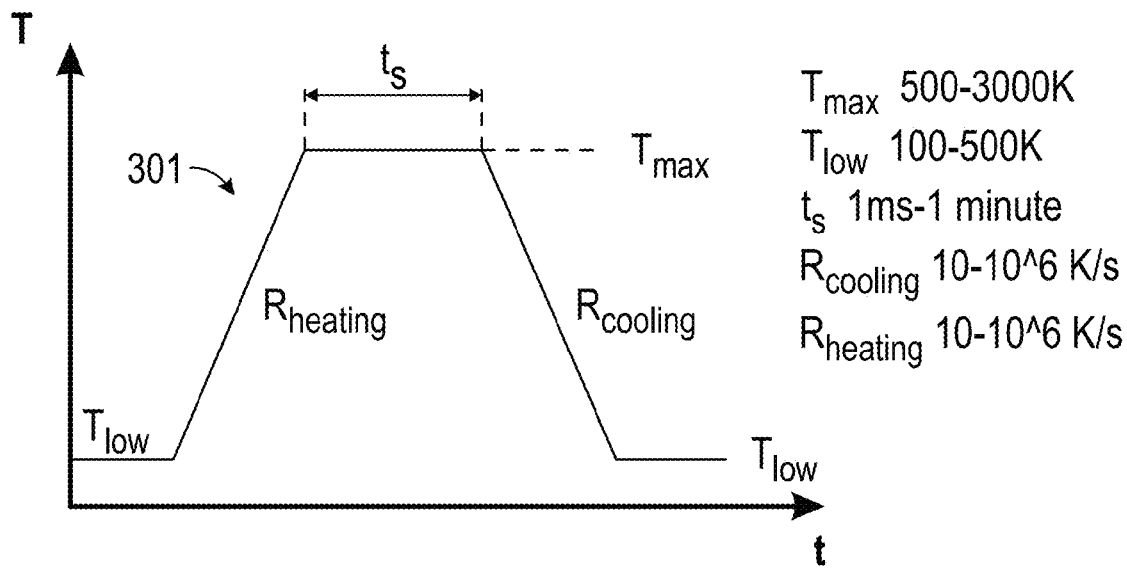
FIG. 3 illustrates a generalized schematic graphical plot of the shock process for manufacturing the multielement nanoparticles or the high-entropy nanoparticles.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware. For instance, when implemented via executable instructions, such as the set of instructions, various elements of the present disclosure are in essence the code defining the operations of such various elements. The executable instructions or code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

More particularly, referring to the features of the present disclosure, a diverse repertoire of well-dispersed, multielemental nanoparticles, including high entropy nanoparticles, can be readily achieved via a rapid, high temperature thermal shock method.

Referring now to FIGS. 1A and 2, a multielement nanoparticle 100 having a size or average diameter d, ranging from a few atoms to at least 1 µm (micrometer) and of various shapes is formed having a composition x, of at least three elements. The composition x may be of metallic elements, or at least three metallic elements forming compounds or composites with non-metal elements. The structure may be homogenous mixing of the three or more elements within the nanoparticles, or the three or more elements forming homogenous compounds or composites with non-metal elements.

Alternatively, as illustrated in FIG. 1B, a high-entropy nanoparticle 110 may be formed, alternately referred to as a high-entropy nanoparticle. The high-entropy nanoparticle 110 includes at least five elements and there is homogenous mixing of the five or more elements within the nanoparticles.

As further illustrated in FIG. 2, the three or more elements in multielement nanoparticles are metallic elements forming homogeneous alloys or are metallic elements forming homogeneous compounds with non-metal elements.

FIG. 3 illustrates a generalized schematic graphical plot of the shock process 301 for manufacturing the multielement nanoparticles 100 or the high-entropy nanoparticles 110.

The y-axis represents temperature T versus the x-axis representing time t. From an initial $T_{low}$ on the left, a heating rate $R_{heating}$ increases the temperature of a precursor material directly or of a substrate having the precursor material loaded thereon to a maximum temperature $T_{max}$ at which the precursor material or the substrate having the precursor material is heated for a time duration $t_s$ which is then followed by a quenching or cooling rate $R_{cooling}$ to a temperature $T_{low}$.

In aspects of the present disclosure, $T_{max}$ ranges from 500-3000 Kelvins (K), $T_{low}$ ranges from 100-500 Kelvins (K). The time duration $t_s$ ranges from 1 millisecond (ms) to 1 minute. The heating rate $R_{heating}$ ranges from 10 to 10E+6 Kelvins/second (K/s). The cooling rate $R_{cooling}$ ranges from 10 to 10E+6 Kelvins/second (K/s).

Figure 4:
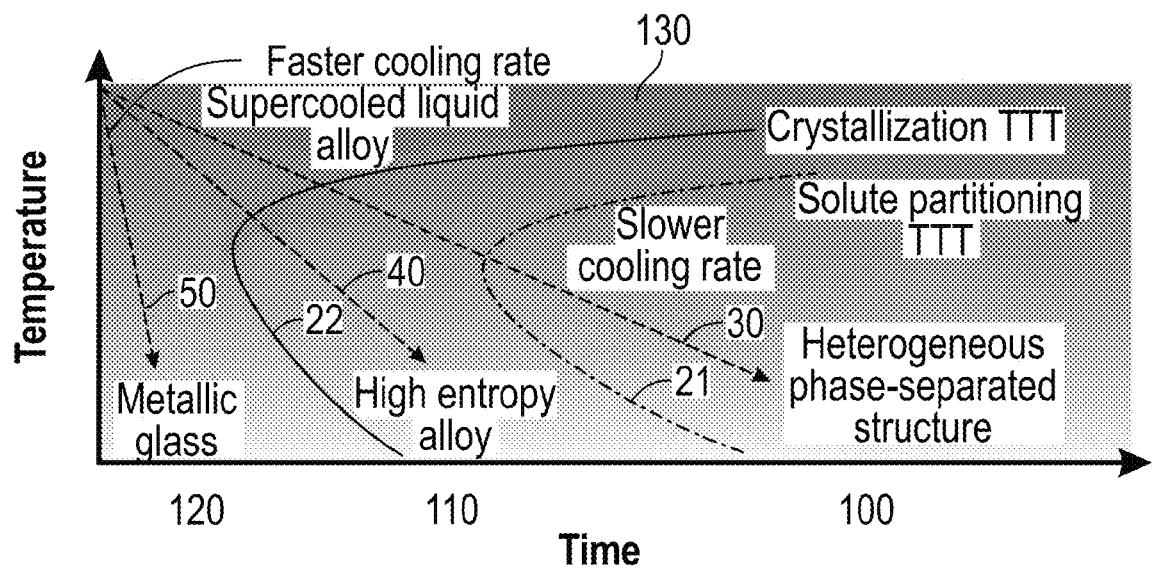
FIG. 4 illustrates a Time-Temperature-Transformation (TTT) diagram showing the kinetic formation of a metallic glass, a homogeneous high-entropy structure and a heterogeneous phase-separated structure, respectively, as a function of cooling rate.

FIG. 4 illustrates a Time-Temperature-Transformation (TTT) diagram showing the kinetic formation of a metallic glass 120, a homogeneous high-entropy structure 110 and a heterogeneous phase-separated structure 100, respectively, as a function of cooling rate ($R_{cooling}$ in FIG. 3).

More particularly, at a faster cooling rate 50, metallic glass 120 is formed. At a relatively slower cooling rate 40 as compared to cooling rate 50, high-entropy nanoparticles (HENP) or in some cases high-entropy alloy (HEA) nanoparticles 110 are formed. At a still relatively slower cooling rate 30 as compared to cooling rates 40 and 50, heterogeneous phase-separated structures 100 are formed. Solute partitioning TTT 21 and crystallization TTT 22 and the formation of supercooled liquid alloy 130 depend on the compositions since the same quenching rate can induce different structures.

After heating, the precursors decompose.

During and after quenching, these elements/phases are still actively moving and diffusing. Therefore, a higher cooling rate limits the diffusion and leads to a homogeneous structure. A lower cooling rate renders a heterogeneous structure because a longer diffusion time is allowed for elemental and/or phase segregation.

Since the same cooling rate applied to precursors having different compositions will produce different structures, it is not practical to identify specific ranges of heating and cooling for the general categories of the kinetic formation of heterogeneous phase-separated structures 100 or homogeneous high-entropy structures 110 or metallic glasses 130 or supercooled liquid alloys 140.

In view of the foregoing, the present disclosure relates to a formation of multielement nanoparticles 100 that include at least three elements, wherein each of the at least three elements is uniformly distributed within the multielement nanoparticles 100. The at least three elements are uniformly distributed within the multielement nanoparticles 100 forming thereby nanoparticles having a homogeneous mixing structure and the at least three elements each represent a respective atom having a particle size dimension.

In an aspect, the at least three elements may include at least five elements, and the at least five elements are uniformly distributed within the multielement nanoparticles forming thereby high-entropy nanoparticles 110, the at least five elements each representing a respective atom having a particle size dimension.

In an aspect, particle size of the at least three elements forming the multielement nanoparticles 100 ranges from a sum of the particle size dimensions of the respective atoms represented by the at least three elements to at least 1 micrometer.

In an aspect, the at least three elements are metallic elements in Groups 1-15 of the Periodic Table of the Elements (49) and are formed into an alloy of the at least three elements.

In an aspect, the at least three elements are metallic elements in Groups 1-15 of the Periodic Table of the Elements and formed as one of compounds or composites with non-metal elements in Groups 13-16 of the Periodic Table of the Elements (49).

Accordingly, in view of the foregoing, the multielement nanoparticles 100 or 110 have a homogeneous mixing structure, or a phase/element separated heterogeneous structure, or a core-shell structure, or a metallic glass structure, or a composite structure or combinations thereof.

Referring now to FIG. 5A, a pre-cursor material 10 may be precursor salts, or corresponding bulk materials or combinations thereof.

Following the application of the thermal shock process as described herein, as shown in FIG. 5B, a multielement nanoparticle 100 having a size or average diameter d, ranging from a few atoms to at least 1 µm and of various shapes is formed having a composition x, of at least three elements. The composition x may be of metallic elements. There may be at least three metallic elements forming compounds or composites with non-metal elements.

As described above and in more detail in the figures which follow, a non all-inclusive, representative example general route for alloying dissimilar elements into single-phase solid solution nanoparticles, referred to as high entropy nanoparticles (HEA-NPs), is enabled herein by shocking precursor metal salt mixtures loaded onto carbon supports (~2000 K, 55 ms duration, rate of ~$10^5$ K/s). A wide range of multicomponent nanoparticles can be synthesized with a desired chemistry (composition), size, and phase (solid solution, phase-separated) by controlling thermal shock parameters (temperature, shock duration, heating/cooling rate).

A non-all-inclusive, representative, general facile, two-step thermal shock method according to the present disclosure employs flash heating and cooling (temperature of 2000 K, shock duration of ~55 ms, and ramp rates on the order of $10^5$ K/s) of metal precursors on oxygenated carbon to produce high entropy alloy nanoparticles (HEA-NPs) with a narrow size distribution and are uniformly dispersed across the carbon support, despite being exposed to high temperatures that conventionally cause particle coarsening. The rapid cooling rate facilitates control over kinetic and thermodynamic mixing regimes and enables the formation of crystalline solid solution nanoparticles, analogous to martensitic steels and metallic glasses that are also kinetically trapped HEAs (19, 20). By adjusting the input electrical pulse parameters, we can also produce phase-separated nanoparticles by decreasing the cooling rate (21). This thermal shock technique opens up a vast space for synthesizing alloys and nanocrystals, which has potential impacts for a wide range of technological applications. It is contemplated that variations of the parameters may further increase the maximum number of elements of the solid solution nanoparticles.

Metal salt precursors $MCl_xH_y$ (M=Pt, Pd, Ni, Fe, Co, Au, Cu, Sn, among others) are mixed into a solution and loaded onto a conductive carbon support, such as carbon nanofibers (CNF).

After drying, the precursor-loaded sample is exposed to a rapid thermal shock (55 ms) in an Ar-filled glovebox, which leads to a high concentration of nanoparticles that form across the carbon surface.

The electrical pulse that is applied controls the thermal exposure conditions, with a common temperature of ~2000 K and heating/cooling rates up to ~$10^5$ K/s can be measured with a pyrometer or other suitable instrument as known in the art.

FIG. 6A-6F describes the structures of multielement nanoparticles formed by thermal shock process.

FIG. 6A illustrates a condition 1000 of homogenous mixing of high-entropy nanoparticle 110.

FIG. 6B illustrates a heterogeneous structure 1010 of phase and/or element segregation for multielement nanoparticle 100. A first element 1011 is in a first phase, a second element 1012 is in a second phase and a third element 1013 is in a third phase.

FIG. 6C illustrates a metallic glass 120 as described above with respect to FIG. 4 as formed at the faster quenching or cooling rate 50. The metallic glass does not form a crystalline structure but an amorphous structure.

FIG. 6D illustrates on the left portion of the figure a core-shell structure 1020 for multielement nanoparticle 100 wherein the core-shell structure 1020 includes a core 1021 surrounded by a shell 1022.

In the center portion of FIG. 6D is a multi-layer core-shell structure 1030 wherein a core 1031 is surrounded by a first shell 1032a and wherein the first shell 1032a is itself surrounded by a second shell 1032b.

On the right portion of FIG. 6D is a composite structure 1040 for multielement nanoparticle 100 wherein a first element 1041 is engaged with a second larger element 1042 and wherein the second larger element 1042 is itself engaged with a third still larger element 1043.

Figure 7A:
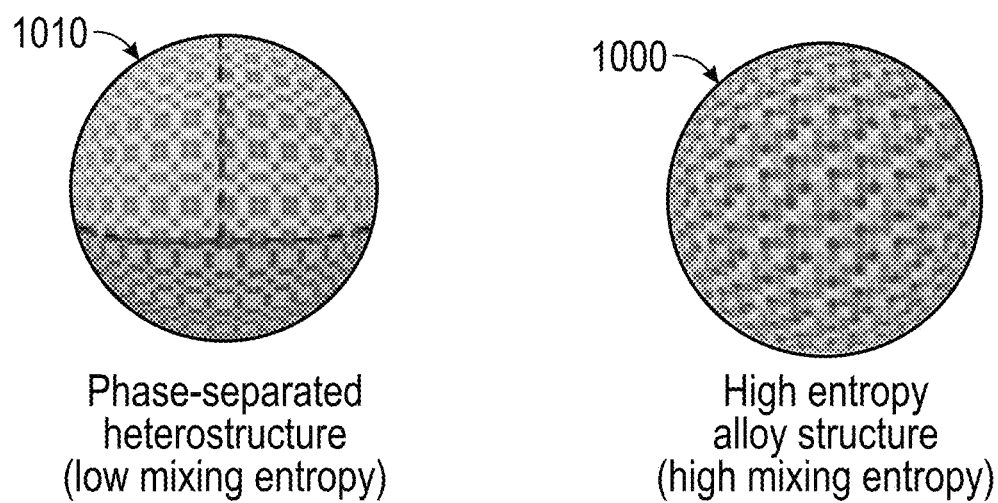
FIG. 7A illustrates a schematic comparison of phase-separated heterostructures synthesized by a conventional slow reduction procedure (slow kinetics) or slower cooling rate $R_{cooling}$ in FIG. 4 versus solid solution high-entropy nanoparticles synthesized by the thermal shock method (fast kinetics) or cooling rate in FIG. 4.

FIGS. 7A-7D2 illustrate elemental characterizations of the condition 1000 of homogenous mixing of high-entropy nanoparticle 110.

More particularly, FIG. 7A illustrates a schematic comparison of phase-separated heterostructures 1010 synthesized by a conventional slow reduction procedure (slow kinetics) or slower cooling rate 30 $R_{cooling}$ in FIG. 4 versus solid solution high-entropy nanoparticles 1000 synthesized by the thermal shock method (fast kinetics) or cooling rate 40 $R_{cooling}$ in FIG. 4

FIGS. 7B1, 7B2 and 7B3 illustrate scanning transmission electron microscopy (STEM) elemental maps of unary (Pt, Au, Fe), binary (PtNi, AuCu, FeNi), and ternary (PtPdNi, AuCuSn, FeCoNi) nanoparticles, respectively. Scale bar: 5 nm.

FIGS. 7C1, 7C2, 7C3 and 7C4 illustrate high angle annular dark-field (HAADF) images and atomic maps and images and STEM elemental maps of high entropy nanoparticles: quinary (PtFeCoNiCu, PtPdCoNiFe), senary (PtCoNiFeCuAu), and septenary (PtPdCoNiFeCuAu), respectively. Scale bar: 10 nm.

FIGS. 7D1 and 7D2 illustrate Individual and low magnification elemental maps (FIG. 7D1—left) and a high-resolution HAADF-STEM image with Fast Fourier Transform (FFT) analysis (FIG. 7D2—right) of octonary (PtPdCoNiFeCuAuSn) high entropy nanoparticles 1000, showing solid solutions with a face-centered-cubic structure, demonstrated by the diffraction FFT pattern. The low magnification elemental maps verify the structural and compositional uniformity of the high entropy nanoparticles 1000. Scale bar: 10 nm.

FIG. 8A illustrates an aspect of the present disclosure of a system 400 for manufacturing a formation of multielement nanoparticles wherein rather than loading the precursors 10 on a substrate, precursors 15 are injected at temperature $T_{low}$ which ranges from 100-500 Kelvins (K) in the direction of arrow A into a heating chamber or vessel 401 forming an internal volume of space 402 which contains therein a plurality of high-temperature heating channels 410a . . . 410n, which may have a circular cross-section as shown or other suitable geometric cross-sectional shape. The precursors 15 are heated to $T_{max}$ which ranges from 500-3000 Kelvins (K) after which time the now transformed precursors, as aggregated multielement nanoparticles 100' or high-entropy nanoparticles 110', are quenched or cooled down to $T_{low}$, again, which ranges from 100-500 Kelvins (K) after exiting the heating chamber or vessel 401.

FIG. 8B illustrates a method diagram for method 450 for manufacturing a formation of nanoparticles via an aerosol spray of precursors 15 as described above and shown in FIG. 8A.

Step 452 includes forming precursors 15 as an aerosol spray.

Step 454 includes spraying the aerosol spray into the aerosol heating chamber or vessel 401.

Step 456 includes heating the precursors 15 in the aerosol heating chamber or vessel 401 to become aggregated multielement nanoparticles 100' or aggregated high-entropy nanoparticles 110'.

Step 458 includes quenching or cooling the aggregated multielement nanoparticles 100' or aggregated high-entropy nanoparticles 110' at a selected cooling rate $R_{cooling}$ (see FIGS. 3 and 4) to become a homogenous mixture 1000 or a phase/element separated heterogenous structure 1010.

Figure 9:
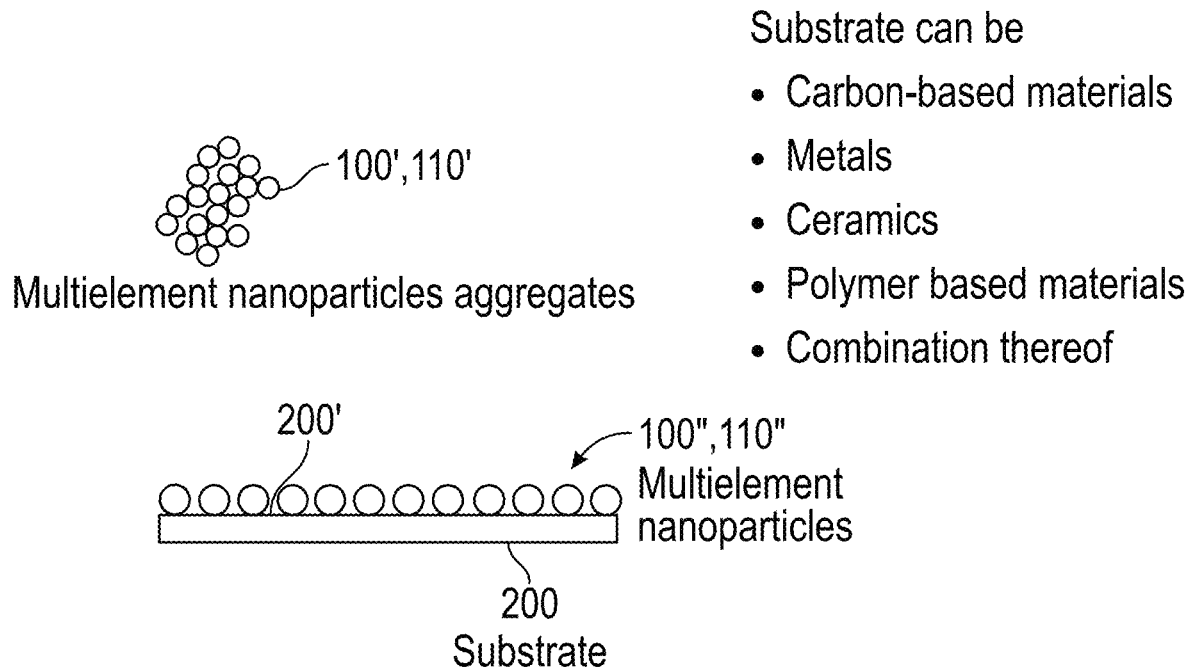
FIG. 9 illustrates in the upper portion a plurality of aggregated multielement nanoparticles or a plurality of aggregated high-entropy nanoparticles or in the lower portion a plurality of multielement nanoparticles or high-entropy nanoparticles formed on a surface of a substrate.

FIG. 9 illustrates in the upper portion a plurality of aggregated multielement nanoparticles 100' or a plurality of aggregated high-entropy nanoparticles 110' or in the lower portion a plurality of multielement nanoparticles 100" or high-entropy nanoparticles 110" formed on a surface 200' of a substrate 200. The substrate 200 may be formed from carbon-based materials, metals, ceramics, polymer-based materials or combinations of the foregoing. The precursor 10 shown in FIG. 5A is first coated uniformly on surface 200' of the substrate 200.

Accordingly, the formation of multielement nanoparticles containing at least three elements 100 or 110 is of multielement nanoparticles that are one of aggregated nanoparticles 100', 110', or nanoparticles 100", 110" supported on a substrate, e.g. substrate 200.

Figure 10A:
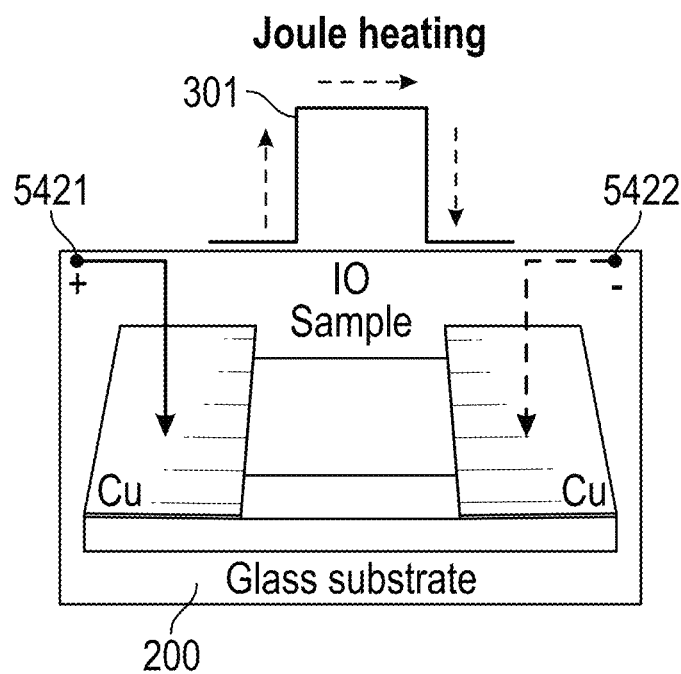
FIG. 10A illustrates the precursor coated or loaded substrate subjected to Joule heating.

FIGS. 10A-10G illustrate the various types of heating elements or methods that may be employed. More particularly, FIG. 10A illustrates the precursor 10 coated or loaded substrate 200 subjected to Joule heating by applying a current I from positive (+) terminal 5421 of a first copper electrode to pass through the precursor 10 coated or loaded substrate 200 to negative (−) terminal 5422 of a second copper electrode.

Figure 10B:
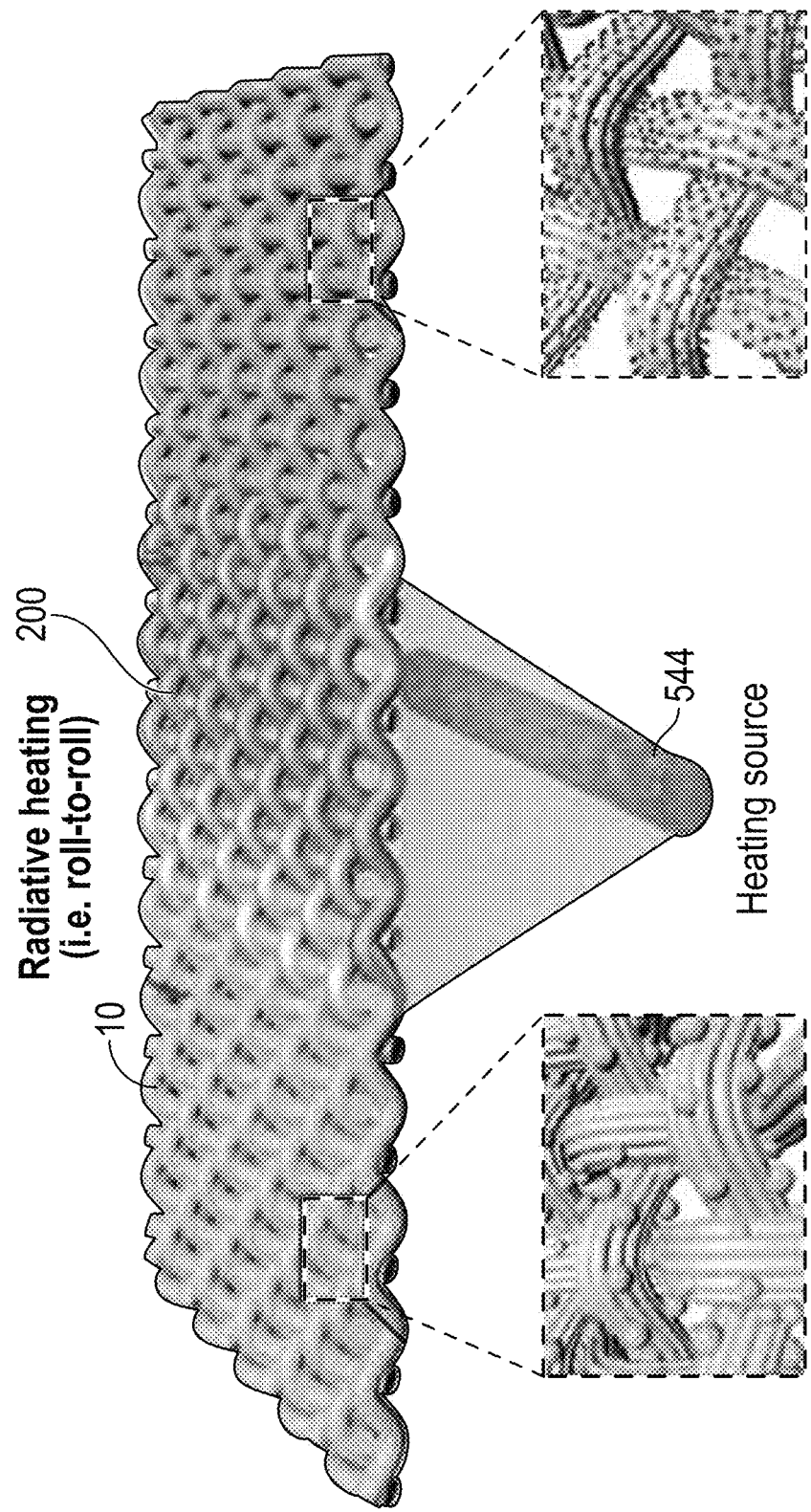
FIG. 10B illustrates a radiative heating element for heating a substrate.

FIG. 10B illustrates a radiative heating element 544 described below in more detail with respect to FIG. 10G. The radiative heating element or elements 544 are positioned at a distance from the precursor 10 coated or loaded substrate 200 to cause radiation heat transfer from the heating element 544 to the precursor 10 coated or loaded substrate 200.

Figure 10C:
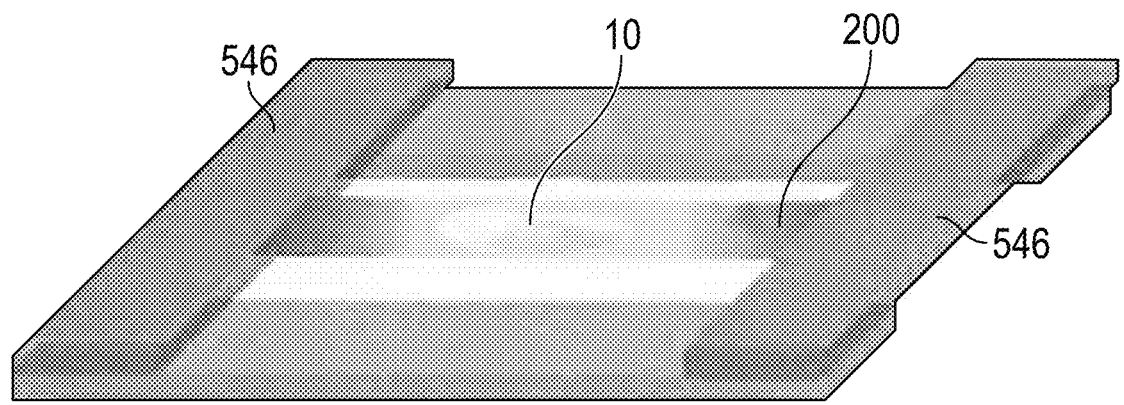
FIG. 10C illustrates a conductive heating element for heating a substrate.

FIG. 10C illustrates a conductive heating element 546 wherein the conductive heating element or elements 546 are positioned in direct contact with the precursor 10 coated or loaded substrate 200 to cause conduction heat transfer from the heating element 544 to the precursor 10 coated or loaded substrate 200.

Figure 10D:
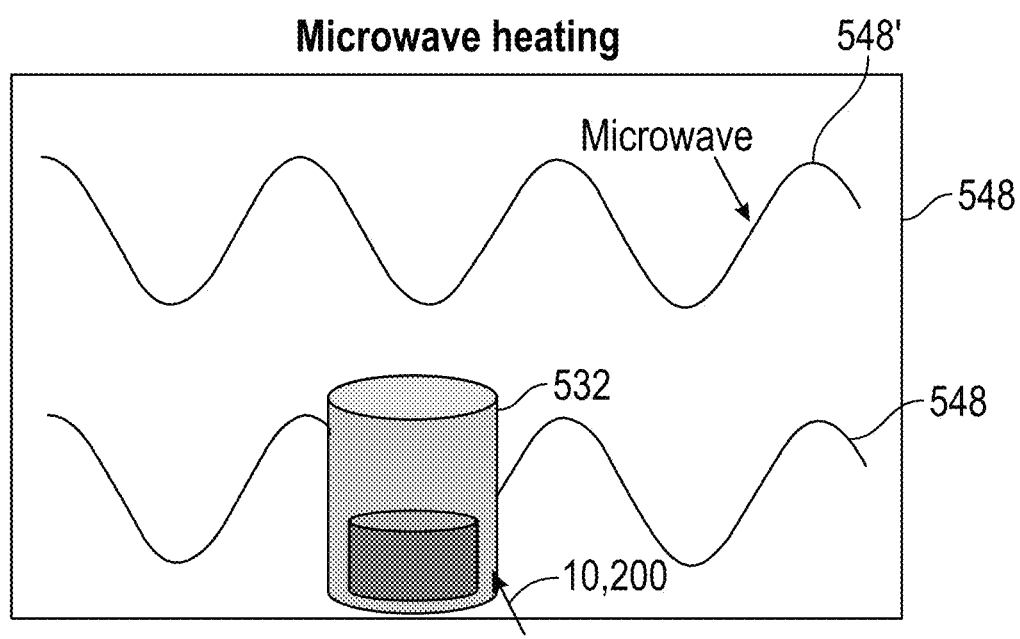
FIG. 10D illustrates a microwave heating enclosure for heating a substrate.

FIG. 10D illustrates a microwave heating enclosure 548 wherein the precursor 10 coated or loaded substrate 200 is enclosed within heating chamber 532 and the heating chamber 532 is enclosed within the microwave heating enclosure 548 to enable microwaves 548' to heat the precursor 10 coated or loaded substrate 200.

Figure 10E:
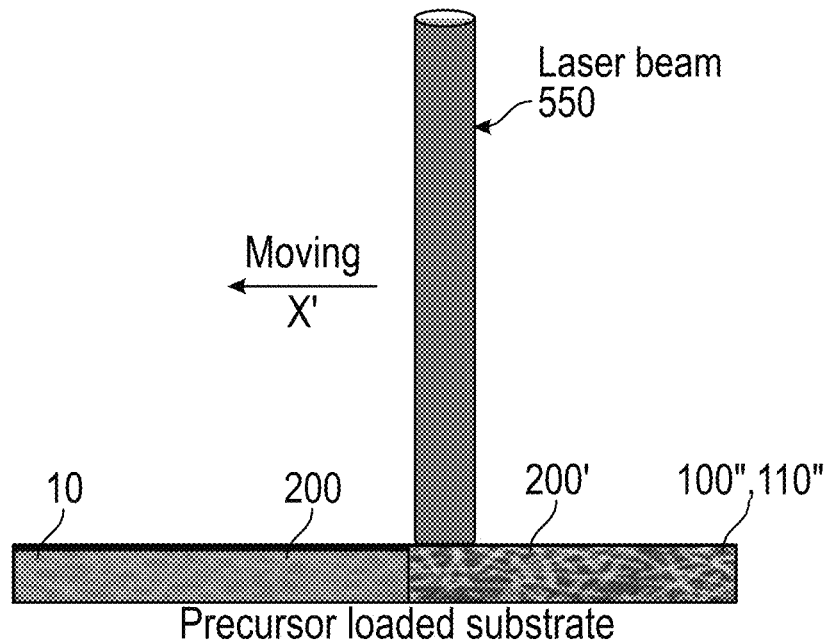
FIG. 10E illustrates laser heating of the precursor coated or loaded substrate wherein a laser beam moves across the surface to transform the precursor to multielement nanoparticles or high-entropy nanoparticles.

FIG. 10E illustrates laser heating of the precursor 10 coated or loaded substrate 200 wherein laser beam 550 moves in a direction such as illustrated by arrow X' across the surface 200' to transform the precursor 10 to multielement nanoparticles 100" or high-entropy nanoparticles 110".

Figure 10F:
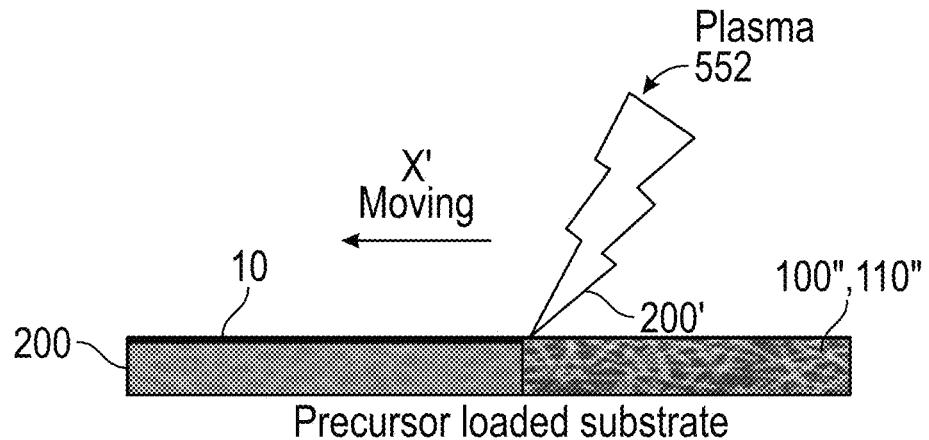
FIG. 10F illustrates plasma heating of the precursor coated or loaded substrate wherein a plasma moves across the surface to transform the precursor to multielement nanoparticles or high-entropy nanoparticles.

FIG. 10F illustrates plasma heating of the precursor 10 coated or loaded substrate 200 wherein a plasma 552 moves in a direction also such as illustrated by arrow X' across the surface 200' to transform the precursor 10 to multielement nanoparticles 100" or high-entropy nanoparticles 110".

FIG. 10G illustrates a detailed view of heating of the precursor 10 coated or loaded substrate 200 wherein a radiative heating source 544 is positioned beneath precursor 10 coated or loaded substrate 200 wherein heating 204 occurs in a central zone extending over the region Z.

FIG. 10G1 illustrates a detailed view of the surface 200' of the substrate 200 showing strands 202 of the substrate and the precursor 10 positioned on the strands 202.

FIG. 10G2 illustrates a detailed view of the surface 200' of the substrate 200 showing strands 202 of the substrate and the now transformed precursor 10 positioned on the strands 202 as multielement nanoparticles 100" or high-entropy nanoparticles 110".

Figure 11:
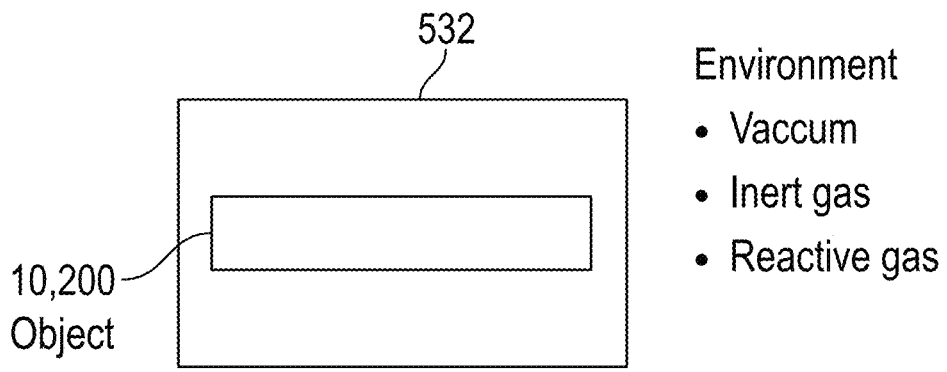
FIG. 11 illustrates an aspect of the present disclosure wherein a substrate with precursors is positioned in a heating chamber wherein the substrate and precursors are heated in an environment that is one of vacuum, inert gas, or a reactive gas.

FIG. 11 illustrates an aspect of the present disclosure wherein substrate 200 with precursors 10 are positioned in heating chamber 532 wherein the substrate 200 and precursors 10 are heated in an environment that is one of vacuum, inert gas such as Argon, or a reactive gas such as oxygen.

Figure 12A:
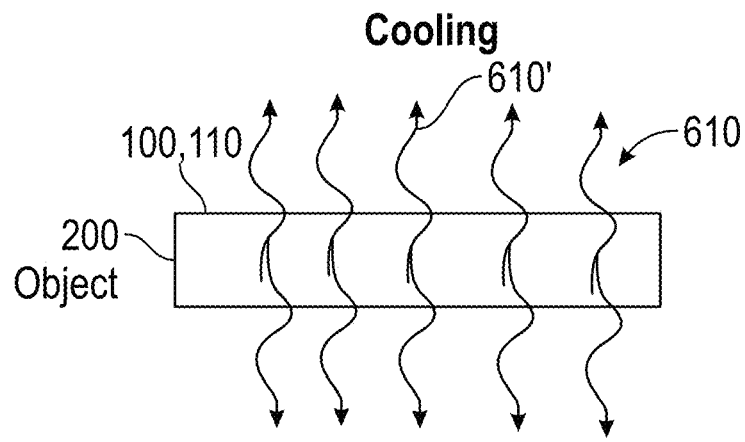
FIG. 12A illustrates an aspect of the present disclosure wherein the quenching or cooling $R_{cooling}$ according to FIGS. 3 and 4 is performed via radiative heat transfer.

FIG. 12A illustrates an aspect of the present disclosure wherein the quenching or cooling $R_{cooling}$ (see FIGS. 3 and 4) may be performed in certain circumstances via cooling 610 wherein the transformed nanoparticles 100" or 110" on substrate 200 are cooled via radiation heat transfer 610'.

Figure 12B:
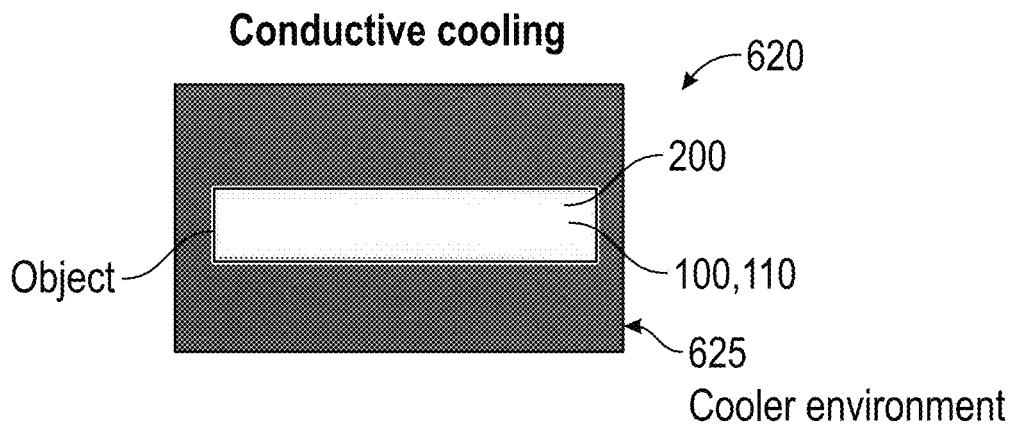
FIG. 12B illustrates an aspect of the present disclosure wherein the quenching or cooling $R_{cooling}$ according to FIGS. 3 and 4 is performed via conductive cooling.

FIG. 12B illustrates an aspect of the present disclosure wherein the quenching or cooling $R_{cooling}$ (see again FIGS. 3 and 4) may be performed in certain circumstances via conductive cooling 620 wherein the transformed nanoparticles 100" or 110" on substrate 200 are cooled via conduction heat transfer to a cooler environment 625.

The cooling methods may include spraying of cryogenic temperature fluids or immersion in cryogenic temperature fluids to achieve conduction or convection cooling. Cryognenic fluids may include in the gaseous or liquid states inert gases such as helium, neon, argon, xenon or the lile as suitable for the particular conditions. Non-inert gases or liquids may also be utilized to implement the cooling as suitable for the particular conditions.

Figure 13A:
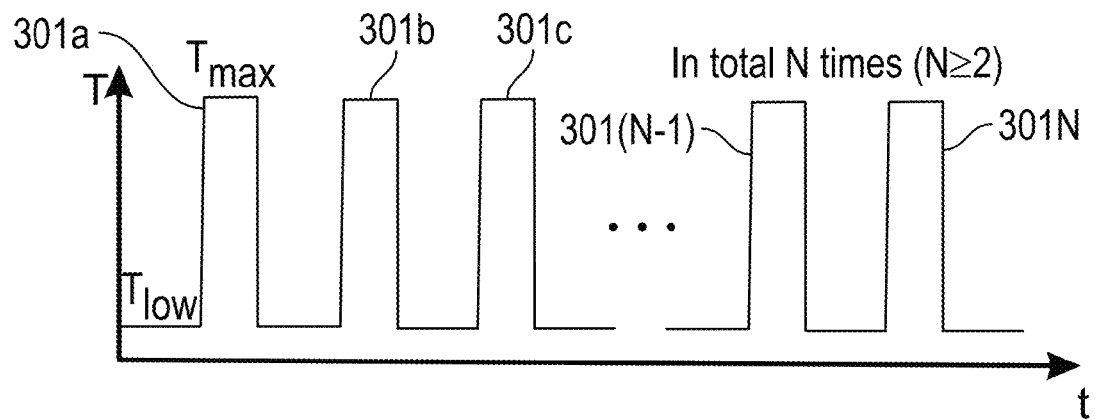
FIG. 13A illustrates a variation in the shock process wherein multiple shocks are applied.

FIG. 13A illustrates a variation in the shock process wherein multiple shocks 301a., 4301b, 301c ... 301N-1 and 301N are applied for a total of N times where N is greater than or equal to 2.

Figure 13B:
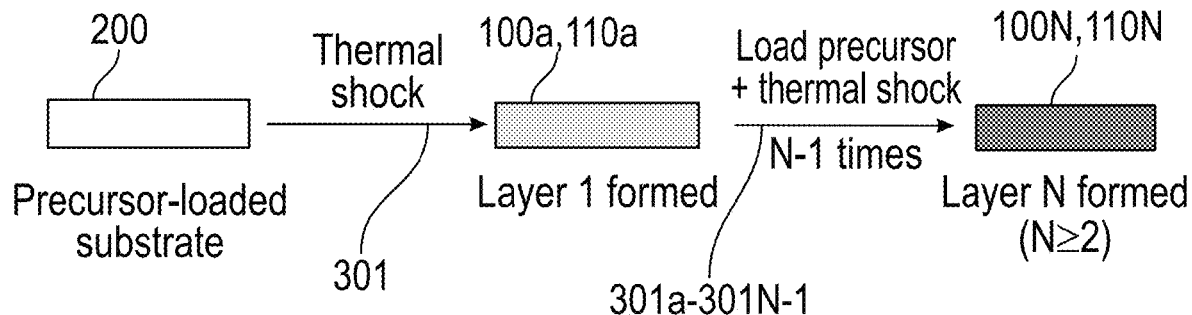
FIG. 13B illustrates a multilayer structure wherein, from left to right, a precursor-loaded substrate is subjected to thermal shock wherein the first thermal shock causes a first layer of either multielement nanoparticles or of high-entropy nanoparticles and wherein the precursor is again loaded on the substrate and thermal shocks are applied to cause a plurality of layers to form.

FIG. 13B illustrates a multilayer structure wherein, from left to right, a precursor-loaded substrate 200 is subjected to thermal shock 301 wherein first thermal shock 301a causes a first layer of either multielement nanoparticle 100a or of high-entropy nanoparticle 110a. The precursor 10 is again loaded on the substrate 200 and thermal shocks 301a-301N-1 are applied for N−1 times until a plurality of layers 100N or 110N are formed where N is greater than or equal to 2.

Figure 14A:
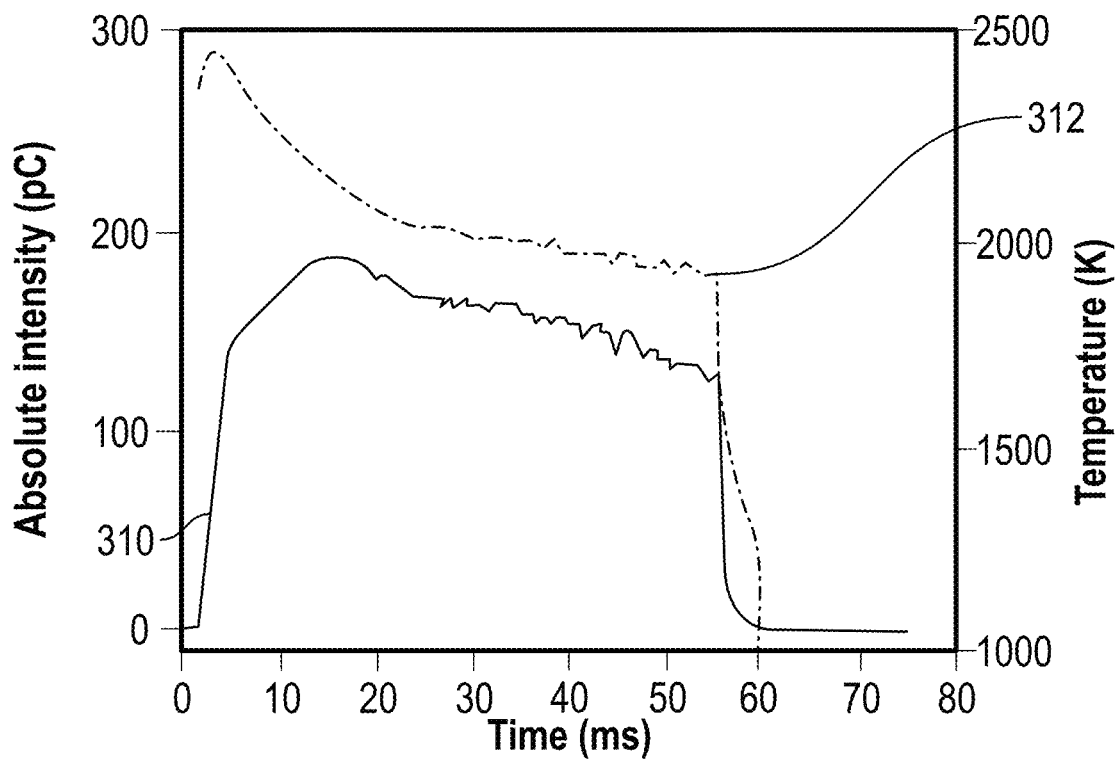
FIG. 14A illustrates a graphical plot of light intensity of a sample thermal shock pulse in counts on the left side versus time in milliseconds while the right side represents a graphical plot of temperature T in Kelvins versus time in milliseconds.

FIG. 14A illustrates a graphical plot 310 of light intensity of a sample thermal shock pulse in counts on the left side versus time in milliseconds while the right side represents a graphical plot 312 of temperature T in Kelvins versus time in milliseconds.

Figure 14B:
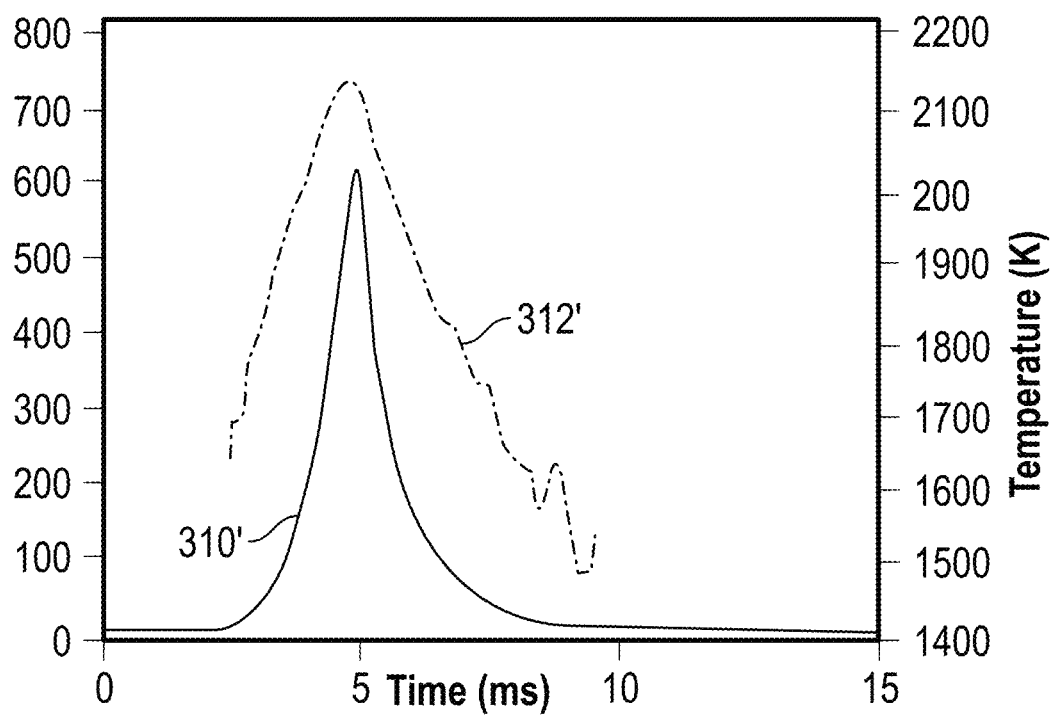
FIG. 14B also represents another graphical plot of light intensity of another sample thermal shock pulse in counts on the left side versus time in milliseconds while the right side represents a graphical plot of temperature T in Kelvins versus time in milliseconds.

FIG. 14B also represents another graphical plot 310' of light intensity of another sample thermal shock pulse in counts on the left side versus time in milliseconds while the right side represents a graphical plot 312' of temperature T in Kelvins versus time in milliseconds.

Figure 15:
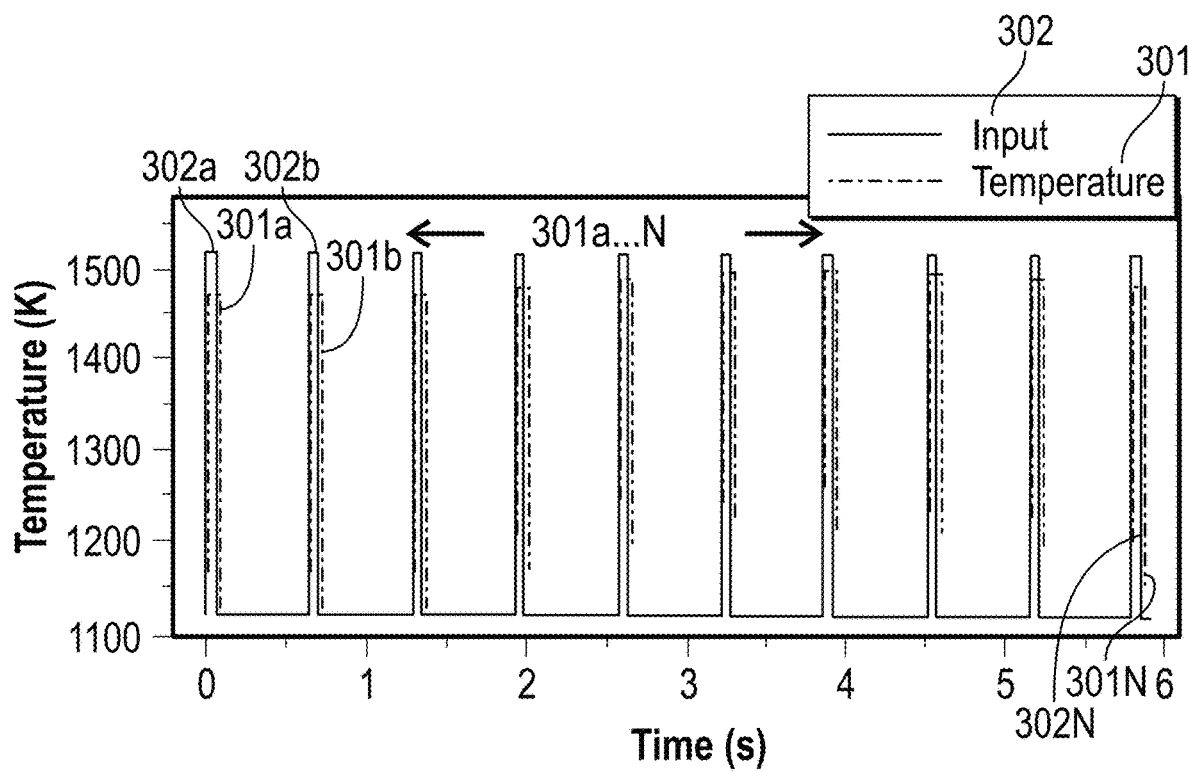
FIG. 15 represents a more detailed example of the multiple shock process of FIG. 13A wherein the temperature for the shock pulses is at a different level.

FIG. 15 represents a more detailed example of the multiple shock process of FIG. 13A wherein the temperature T for the shock pulses 301a, 301b . . . 301N range from T=1125 K to T=1500 K for the temperatures 301.

Figure 16:
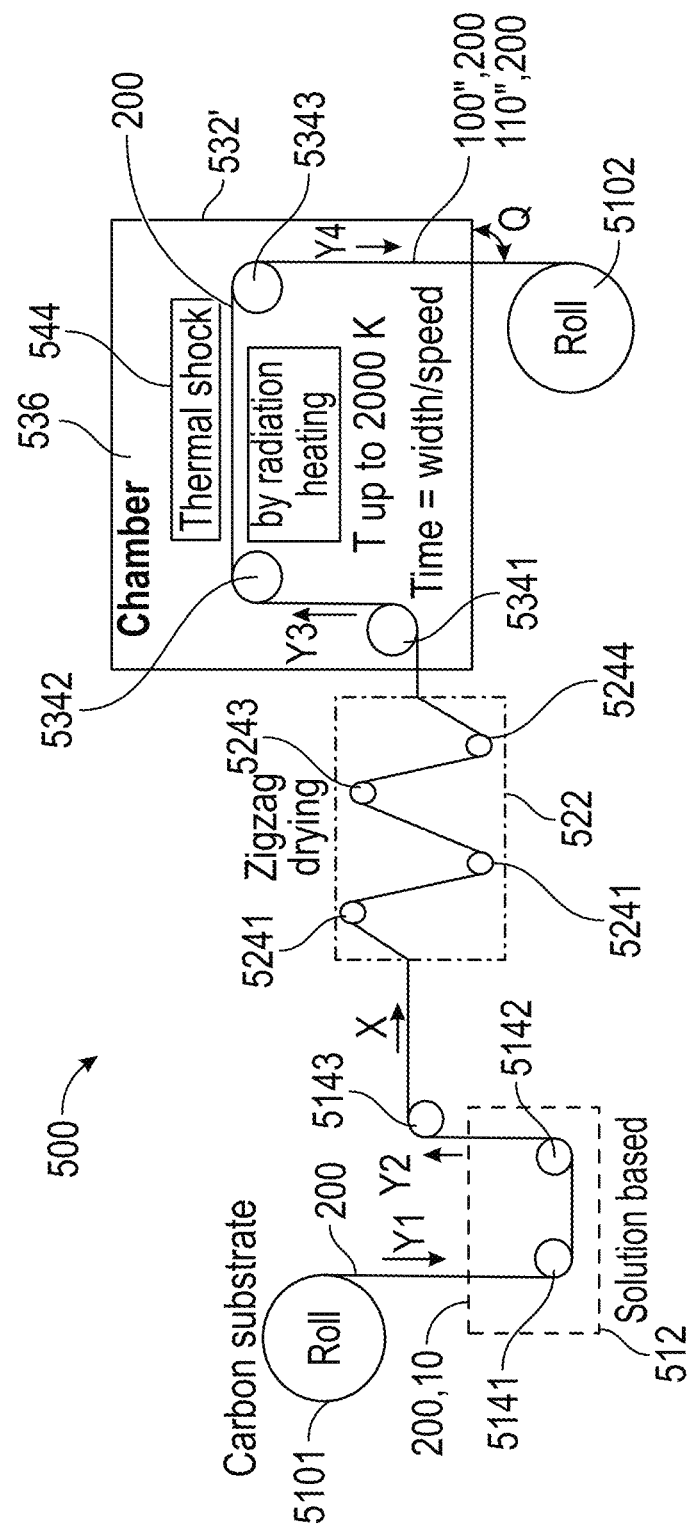
FIG. 16 illustrates an aspect of the present disclosure of a system for manufacturing a formation of multielement nanoparticles via a roll-to-roll synthesis or manufacturing process.

FIG. 16 illustrates an aspect of the present disclosure of a system 500 for manufacturing a formation of multielement nanoparticles 100" or 110" via a roll-to-roll synthesis or manufacturing process.

More particularly, prior to coating uniformly a solution-based salt precursor 10 on substrate 200, a substrate distribution mechanism in the form, for example of a first rotational storage structure 5101 distributes the substrate 200 from the first rotational storage structure 5101, e.g., a storage roll, to a solution storage container 512 that contains first and second rotational elements 5141 and 5142. The first rotational element 5141 receives the substrate 200 in the direction of arrow Y1 and transfers the substrate 200 to second rotational element 5142 during which time the precursor 10 is implanted on a surface of the substrate 200 as shown in FIG. 9. The transfer process continues such that the substrate 200 now having the implanted precursor 10 is transferred to a third rotational element 5143 in the direction of arrow Y2. Accordingly, the method 500 includes coating uniformly a solution-based precursor 10 on the substrate 200 by immersing the substrate 200 in the solution storage container 512.

After being rotated by rotational element 5143, the substrate 200 and precursor 10 are transferred in the direction of arrow X to a drying vessel 522 having a series of rotational elements 5241, 5242, 5243 and 5244 arranged such that the substrate 200 with implanted precursor 10 traverses through the drying vessel 522 in a zig-zag manner to increase travel time through the drying vessel 522 to increase drying effectiveness. The drying process reduces the moisture content of the substrate 200 and implanted precursor 10 as closely as possible to 0%.

The transfer process continues by transferring the substrate 200 which has been uniformly coated with the precursor 10 to heating chamber 532'. The heating chamber 532' also includes rotational elements wherein first rotational element 5341 receives the uniformly coated substrate 200 and transfers the substrate 200 in the direction of arrow Y3 to second rotational element 5342. The substrate 200 which has been uniformly coated with the salt solution-based precursor 10 is now heated to a temperature $T_{max}$ ranging from 500 K to 3000 K for a time duration is ranging from 5 milliseconds to 55 milliseconds or from 1 millisecond to 1 second wherein the transformation of the precursor 10 to a plurality of multielement nanoparticles 100" or a plurality of high-entropy nanoparticles 110" occurs. The heating chamber 532' is generally filled with a gas such that the heating of the salt precursor solution-based substrate 200 is performed in a gaseous environment 536 that is one of a vacuum or an inert atmosphere or a reactive atmosphere. The heating element 540 may be one of several types as described above with respect to FIGS. 10A-10G wherein a radiative heating element 544 is illustrated by way of example in FIG. 16.

After being heated by the heating element 544, the now multielement nanoparticles 100" or high-entropy nanoparticles 110" are transferred from the heating chamber 532 to a second rotational storage structure 5102 outside of the heating chamber 532. At this time, quenching of the salt precursor solution-based substrate 200 and the multielement nanoparticles 100 or high-entropy nanoparticles 110 at a rate ranging from 10 K/second to not greater than 10E+6 K/second. The second rotational storage structure 5102 is configured to receive the salt precursor solution-based substrate 200 at a speed sufficient to enable the quenching at a rate $T_{cooling}$ ranging from 10 K/second to not greater than 10E+6 K/second.

Figure 17A:
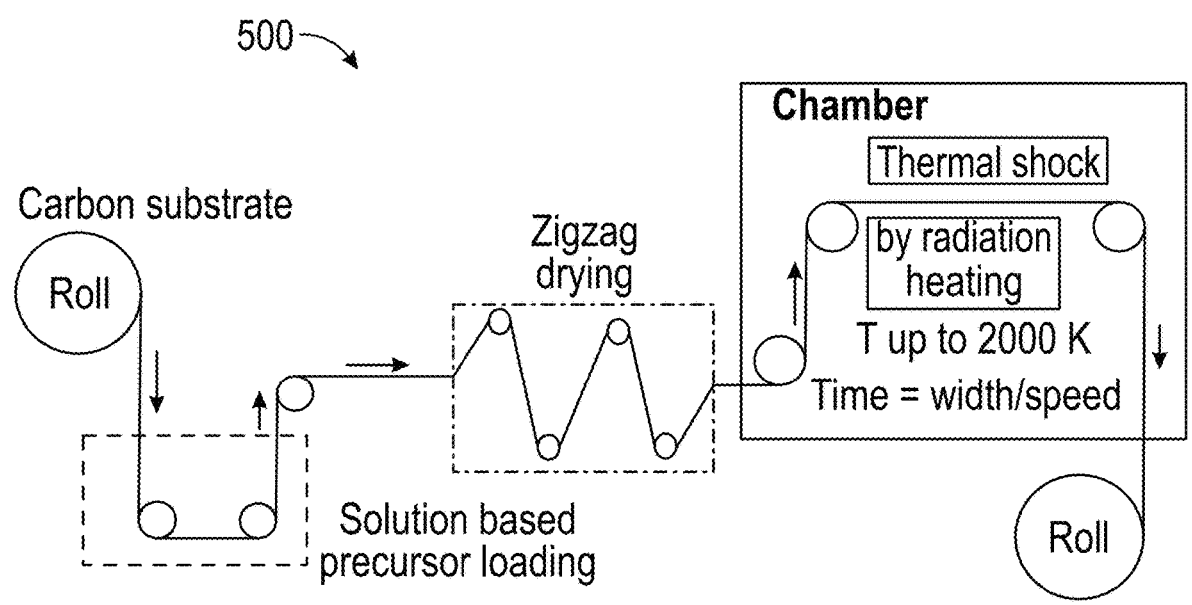
FIG. 17A illustrates a reduced scale version of system of FIG. 16 of the continuous roll-to-roll manufacturing schematic of a carbon-metallic nanoparticles composite by rapid radiative heating.

FIG. 17A illustrates a reduced scale version of system 500 of FIG. 16 of the continuous roll-to-roll manufacturing schematic of a carbon-metallic nanoparticles composite by rapid radiative heating.

Figure 17B:
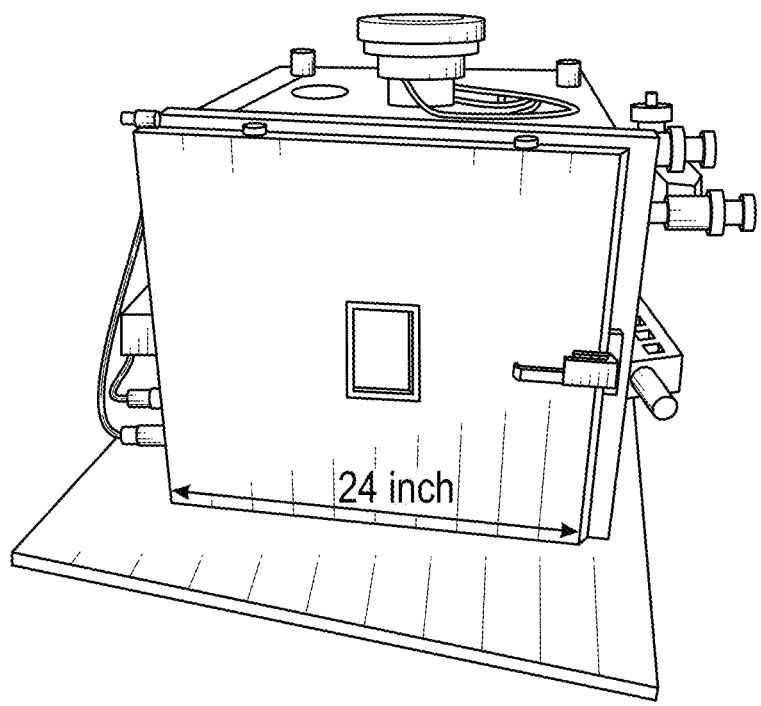
FIG. 17B illustrates a custom-built chamber to simulate a small-scale roll-to-roll process located within the laboratory of one of the inventors at the University of Maryland, College Park.

FIG. 17B illustrates a custom-built chamber to simulate a small-scale roll-to-roll process located within the laboratory of one of the inventors at the University of Maryland, College Park.

Figure 17C:
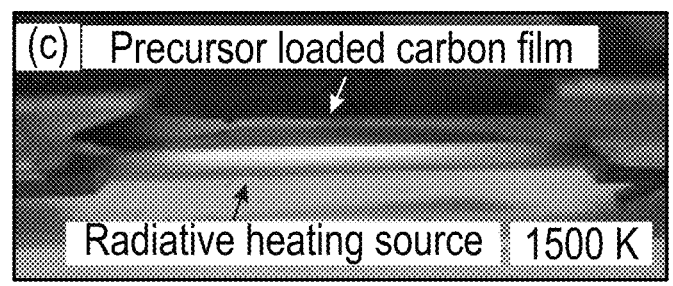
FIG. 17C illustrates mimicking the roll-to-roll process by radiation-based heating, wherein the precursor-loaded carbon substrate was placed above the radiative heating source.

FIG. 17C illustrates mimicking the roll-to-roll process by radiation-based heating, wherein the precursor-loaded carbon substrate was placed above the radiative heating source for ~1 s at ~1500K.

Figure 17D:
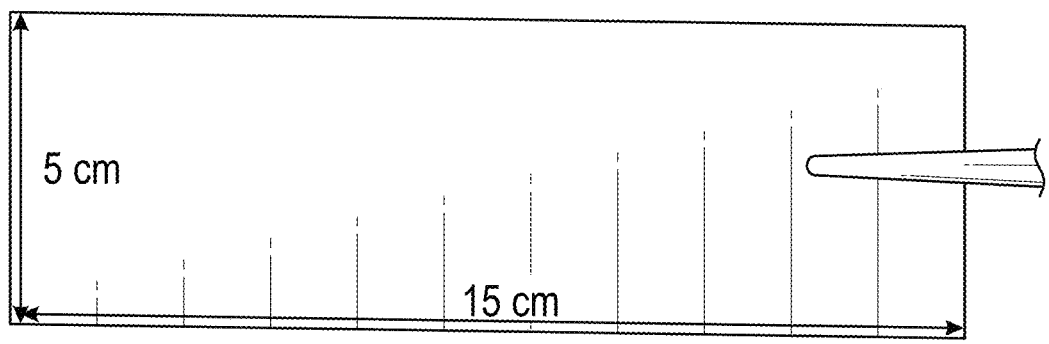
FIG. 17D illustrates the nanoparticles loaded carbon film synthesized by radiation-based heating. SEM image of nanoparticles synthesized by radiative heating on a carbon nanofibers film.

FIG. 17D illustrates the nanoparticles loaded carbon film synthesized by radiation-based heating. SEM image of Pt nanoparticles synthesized by radiative heating on a ~30 μm thick carbon nanofibers film.

Figure 17E:
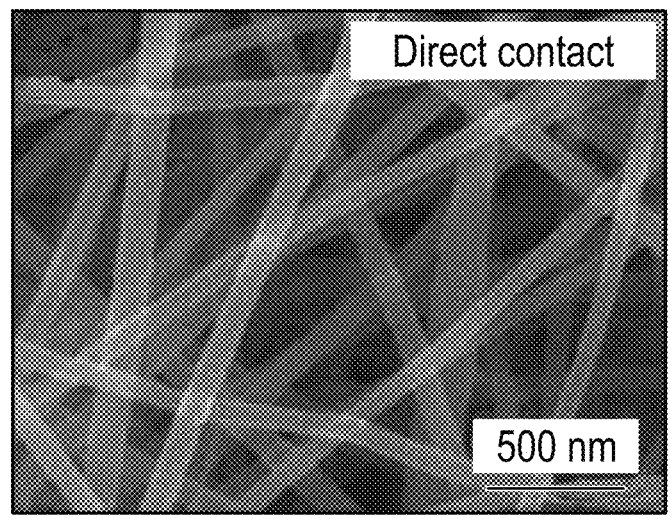
FIG. 17E illustrates a magnification of the direct contact side of the nanoparticles loaded carbon film.

FIG. 17E illustrates a magnification of the direct contact side of the nanoparticles loaded carbon film.

Figure 17F:
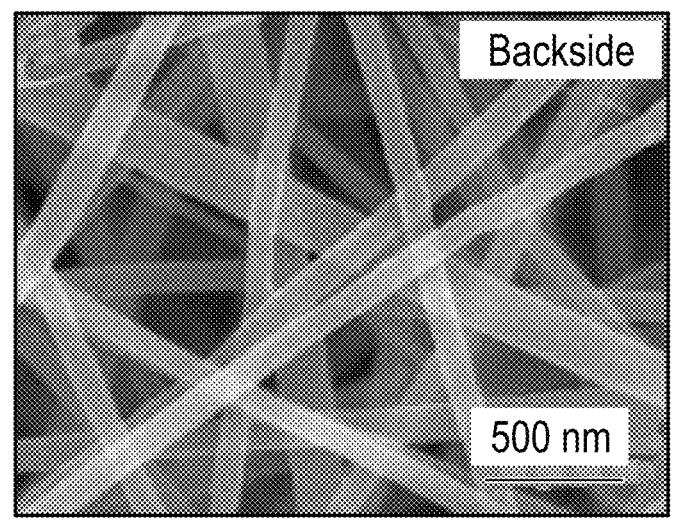
FIG. 17F illustrates a magnification of the underside or back side of the nanoparticles loaded carbon film.

FIG. 17F illustrates a magnification of the underside or back side of the nanoparticles loaded carbon film.

Figure 18:
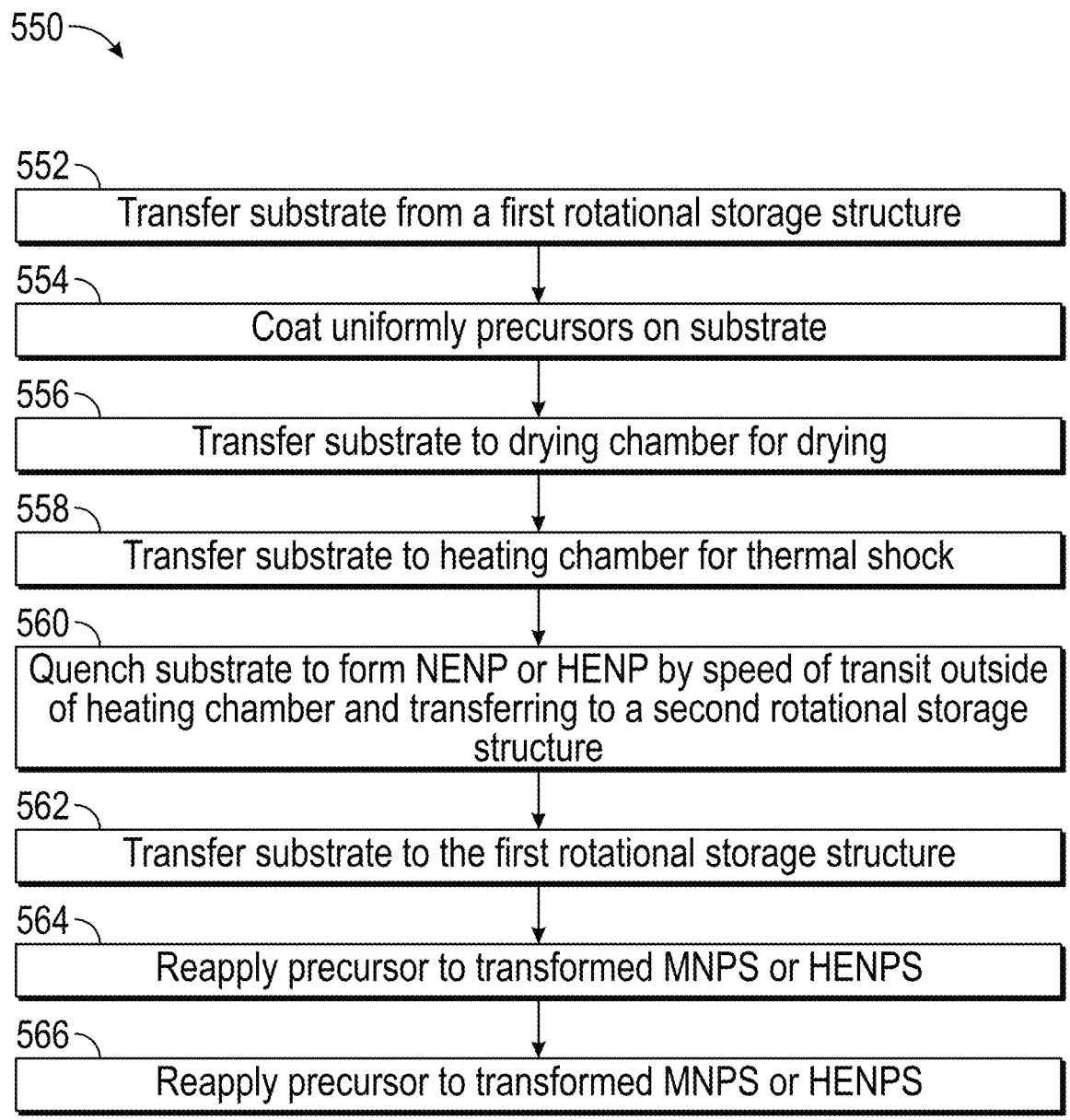
FIG. 18 illustrates a method diagram for method for manufacturing a formation of nanoparticles via precursors such as described and shown in FIGS. 16 and 17A-17F.

FIG. 18 illustrates a method diagram for method 550 for manufacturing a formation of nanoparticles 100", 110" via precursors 10 as described above and shown in FIGS. 16 and 17A-17F.

Method 550 is performed wherein prior to a step of coating uniformly solution-based salt precursor 10 on substrate 200, step 552 includes distributing or transferring the substrate 200 from the first rotational storage structure 5101 to solution storage container 512.

Step 554 includes coating uniformly solution-based salt precursor 10 on the substrate 200 by immersing the substrate 200 in the solution storage container 512.

Depending on the particular conditions, the method may include step 556 of transferring the substrate 200 to drying vessel or chamber 522 for drying.

Step 558 includes transferring the substrate 200 for heating the salt precursor solution-based substrate 200 to a temperature which may range from 500 K to 3000 K for a time duration which may range from 1 millisecond to 1 minute.

Step 560 includes quenching the precursor-loaded substrate, which may include by speed of transit outside of the heating chamber 522, at a rate ranging from 10 K/second to 5×10E+6 K/second by step 562 includes transferring the precursor-loaded substrate with transformed multielement nanoparticles (MNPS) 100" or high-entropy nanoparticles (HENPS) 110" to second rotational storage structure 5102 configured to receive the precursor-loaded substrate 200 at a speed sufficient to enable the quenching at a cooling rate result in a formation of multielement nanoparticles from at least three elements.

Step 564 may include reapplying precursor 10 to the transformed MNPS 100" or HENPS 110" to form an additional layer and then including step 566 of repeating the drying, transferring, thermal shock and quenching to form a multi-layer multielement nanoparticle structure.

With respect to both method 450 described above with respect to FIGS. 8A and 8B and with respect to method 550 described above with respect to FIGS. 16 and 18, the methods include methods for manufacturing a formation of multielement nanoparticles 100', 110' or 100", 110", respectively, that includes providing a precursor material 15 or 10 composed of at least three component elements; heating the precursor material 15 or 10 to a temperature and for a time duration; and quenching the precursor 15 or 10 that has been heated to the temperature and for the time duration to a temperature at a cooling rate, wherein the heating of the precursor 15 or 10 to a temperature and for a time duration and the quenching of the precursor 15 or 10 that has been heated to the temperature and for the time duration to a temperature at a cooling rate result in a formation of multielement nanoparticles 100', 110' or 100", 110" containing, as final multielement nanoparticles, at least the at least three component elements of the precursor material, the heating and the quenching representing thereby a multielement nanoparticle thermal shock formation process.

FIGS. 19A1-19A3 are photographs of carbonized wood as a 3D substrate 210 or 212 to increase the nanoparticle production of the thermal shock method 550.

FIG. 19A1 is a digital image of wood 210 and FIG. 19A2 is a digital image of carbonized wood 212.

FIG. 19A3 is an SEM image of the carbonized wood 212. Wood has a unique microstructure: open microsized pores on the top surface and vertically-aligned microsized channels in the thickness direction.

FIGS. 19B1, 19B2 and 19B3 are SEM images of uniformly distributed quinary high entropy nanoparticles (PtPdRhRuCe) in three different locations 1, 2 and 3 of the 3D substrate 212 as noted in FIG. 19A3.

Figure 20:
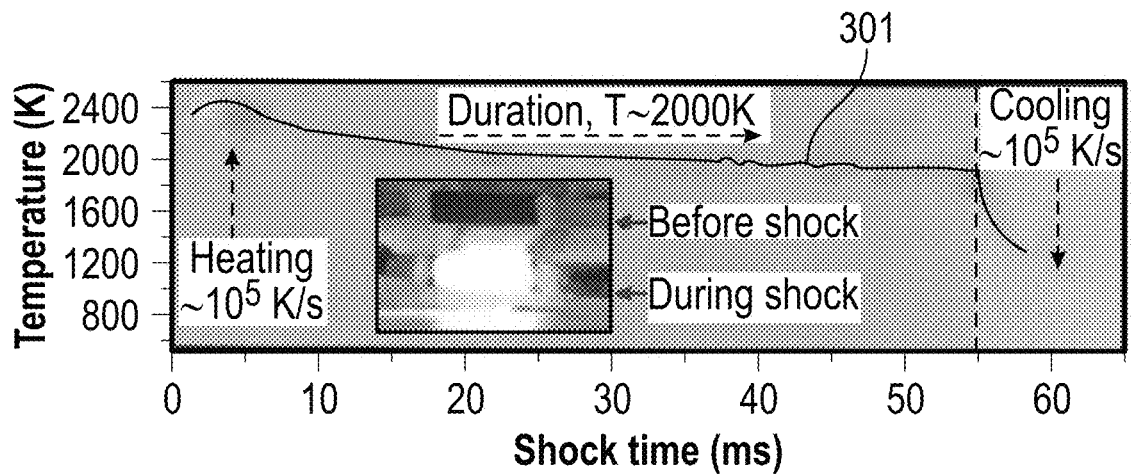
FIG. 20 illustrates a thermal shock process for multielement nanoparticles synthesis.

FIG. 20 illustrates a thermal shock having a duration of 55 milliseconds followed by a cooling rate of 10E+5 K/s.

FIG. 20A1 illustrates the precursor salt mixture 10 on substrate 200.

FIG. 20A2 illustrates the thermal shock 301 applied to the substrate 200 and the precursor salt mixture 10.

FIG. 20A3 illustrates the MENPs 100" formed by the thermal shock 301 for 55 milliseconds.

FIG. 20B1 illustrates the salt precursor loaded carbon nanofiber film. FIG. 20B2 illustrates the picture of the film. FIG. 20B3-20B4 illustrates the SEM and TEM images of the uniformly distributed nanoparticles after the thermal shock process.

In as aspect of the present disclosure, FIGS. 21A-21E illustrate a method of using high-entropy nanoparticles formed by the thermal shock process according to the present disclosure. More particularly, FIGS. 21A-21E illustrate catalytic performance of quinary HEA-NPs (PtPdRhRuCe) for ammonia oxidation.

Figure 21A:
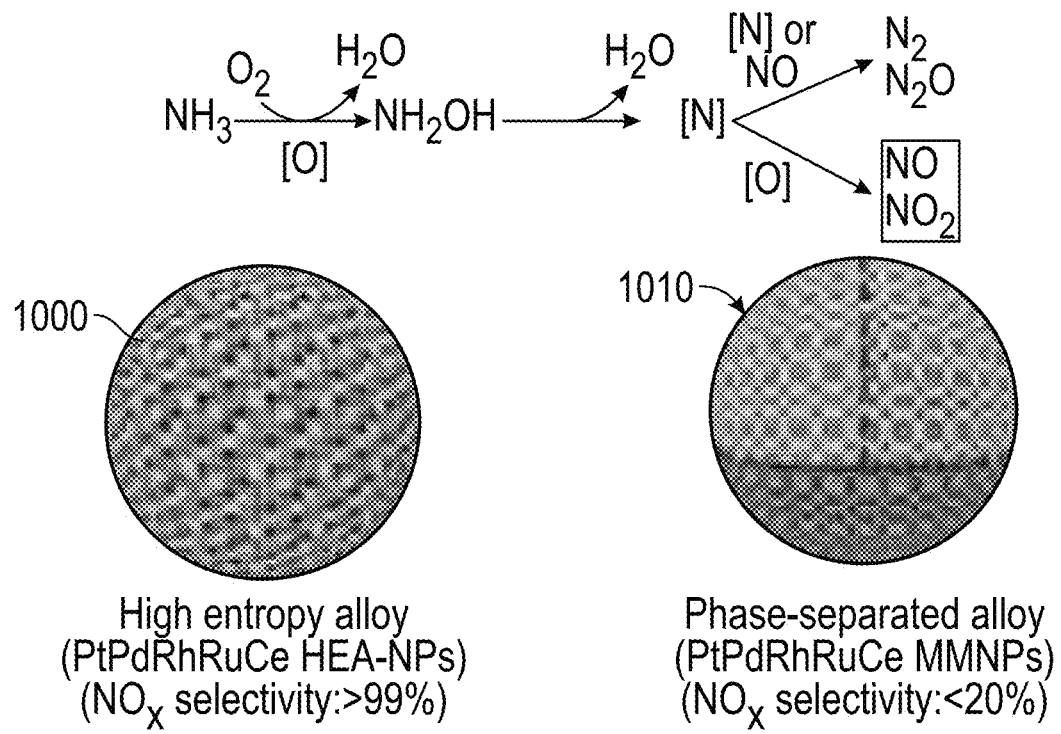
FIGS. 21A-21E illustrate a method of using high-entropy nanoparticles formed by the thermal shock process according to the present disclosure or catalytic performance of quinary HEA-NPs (PtPdRhRuCe) for ammonia oxidation and particularly.

FIG. 21A illustrates the reaction scheme for the ammonia oxidation process as well as the structural and performance differences between the PtPdRhRuCe HEA-NPs synthesized by the CTS method according to the present disclosure and a control sample (PtPdRhRuCe MMNPs) by wet impregnation.

Figure 21B:
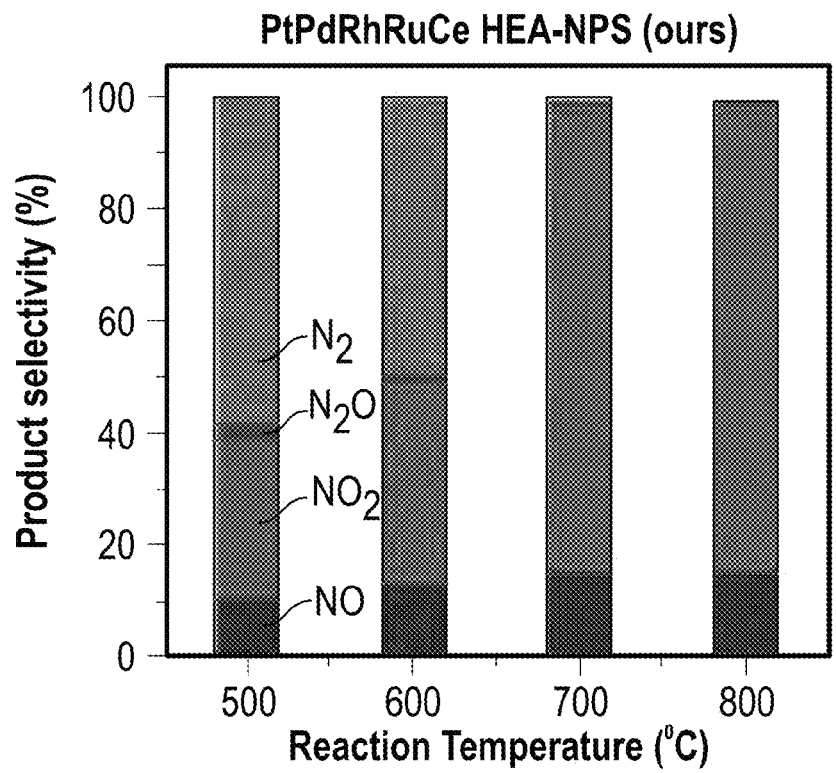
Figure 21C:
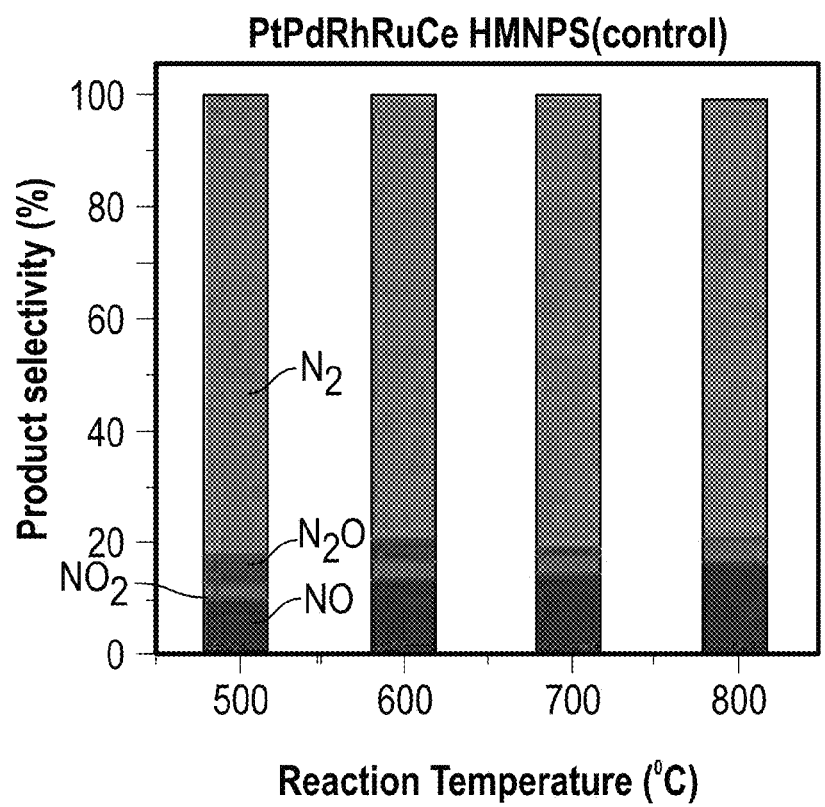

FIGS. 21B and 21C illustrate temperature-dependent product distribution and conversion of $NH_3$ for PtPdRhRuCe HEA-NPs and PtPdRhRuCe MMNPs, respectively.

Figure 21D:
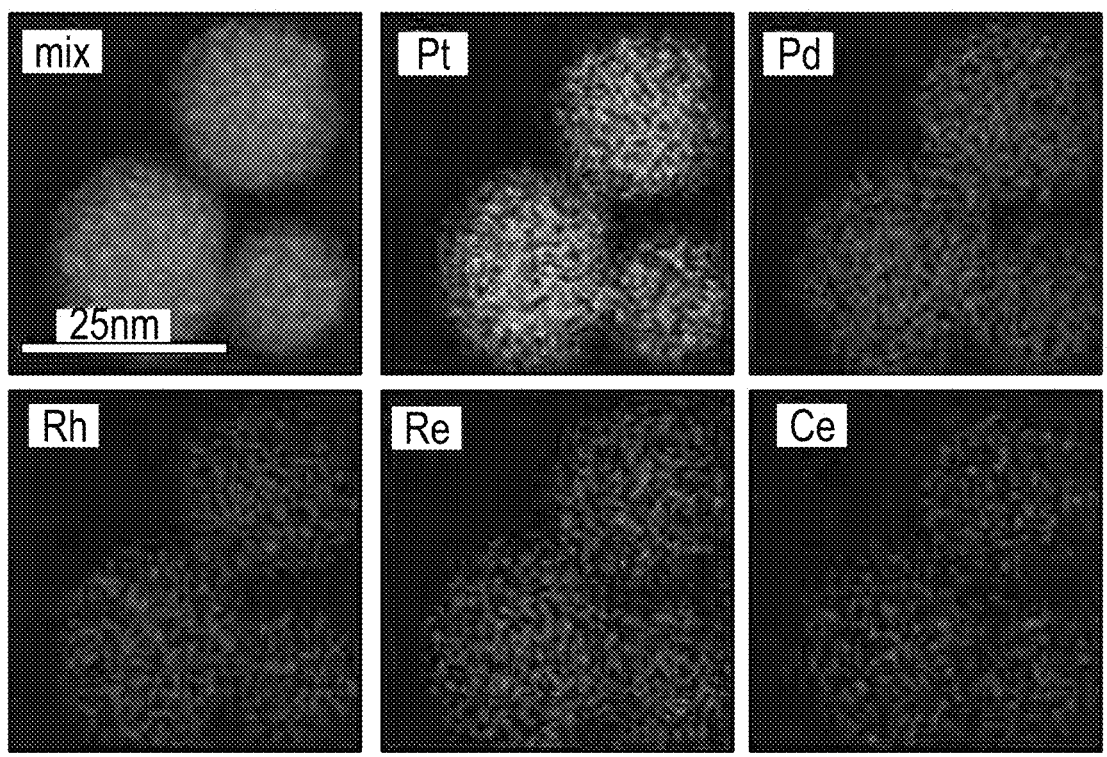

FIG. 21D illustrates STEM elemental maps for PtPdRhRuCe HEA-NPs.

Figure 21E:
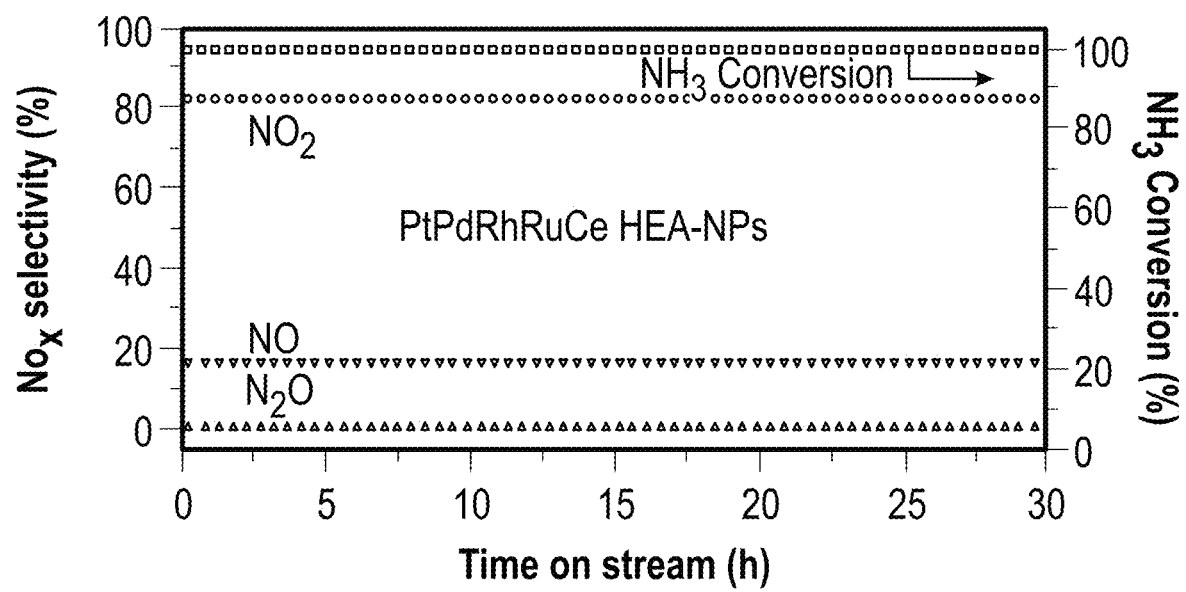

FIG. 21E illustrate the time-dependent catalytic performance of PtPdRhRuCe HEA-NPs at 700° C.

In a representative but non-all-inclusive experiment, ~100% conversion of ammonia ($NH_3$) and >99% selectivity toward NOx ($NO+NO_2$) was achieved at a relatively low operation temperature of 700° C. with the synthesized PtPdRhRuCe HEA-NP catalyst (FIG. 21B). For comparison, similar catalysts (in terms of composition) were prepared by the wet impregnation method (denoted as PtPdRhRuCe MMNP), which produced a 18.7% yield of NOx at the same operation temperature, while most of the output was $N_2$ (FIG. 21C). An elemental map comparison between the two catalysts suggests that the enhanced catalytic selectivity of the HEA-NPs is likely due to the highly homogeneous nature of the solid solution nanoparticles compared to the phase-separated heterostructures derived from the wet impregnation method (FIG. 21D). Note that synthesizing solid solution PtPdRh multimetallic systems by conventional synthetic methods is challenging due to immiscibility (34, 37). Degradation testing to study catalytic performance under prolonged operation conditions was performed and no degradation was observed in terms of catalytic activity or selectivity over ~30 h of continuous operation at 700° C. (FIG. 21E). This durability has been attributed to the high entropy nature of the catalysts prepared by the CTS method, which helps stabilize the MMNPs into solid solutions (i.e. HEA-NPs) and prevents phase separation or elemental segregation owing to the intrinsically slow diffusion associated with HEAs (16, 18). Moreover, the precious metal content of the HEA-NPs can be reduced further without compromising catalytic performance or stability, by replacing ~37.5% of Pt with Co and eliminating Ru (e.g., PtPdRhCoCe HEA-NPs). Thus, HEA-NPs fabricated by the CTS method may be a general route towards highly active, durable, and cost-effective catalysts.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES AND NOTES

The following references are incorporated herein by reference in their entirety:
1. P.-C. Chen et al., Polyememental nanoparticle libraries. Science 352, 1565-1569 (2016).
2. L. Bu et al., Biaxially strained PtPb/Pt core/shell nanoplate boosts oxygen reduction catalysis. Science 354, 1410-1414 (2016).
3. S. G. Kwon et al., Heterogeneous nucleation and shape transformation of multicomponent metallic nanostructures. Nat. Mater. 14, 215-23 (2015).
4. M. Takahashi et al., Finely controlled multimetallic nanocluster catalysts for solvent-free aerobic oxidation of hydrocarbons. Sci. Adv. 3, e1700101 (2017).
5. X. Huang et al., High-performance transition metal—doped Pt3Ni octahedra for oxygen reduction reaction. Science 348, 1230-1234 (2015).
6. G. Chen et al., Interfacial Effects in Iron-Nickel Hydroxide-Platinum Nanoparticles Enhance Catalytic Oxidation. Science 344, 495-499 (2014).
7. M. R. Buck, J. F. Bondi, R. E. Schaak, A total-synthesis framework for the construction of high-order colloidal hybrid nanoparticles. Nat. Chem. 4, 37-44 (2011).
8. N. A. Frey, S. Peng, K. Cheng, S. Sun, Magnetic nanoparticles: synthesis, functionalization, and applications in bioimaging and magnetic energy storage. Chem. Soc. Rev. 38, 2532 (2009).
9. M. B. Cortie, A. M. McDonagh, Synthesis and optical properties of hybrid and alloy plasmonic nanoparticles. Chem. Rev. 111, 3713-3735 (2011).
10. K. D. Gilroy, A. Ruditskiy, H.-C. Peng, D. Qin, Y. Xia, Bimetallic Nanocrystals: Syntheses, Properties, and Applications. Chem. Rev. 116, 10414-10472 (2016).
11. E. Reddington et al., Combinatorial Electrochemistry: A Highly Parallel, Optical Screening Method for Discovery of Better Electrocatalysts. Science 280, 1735-1737 (1998).
12. P. C. Chen et al., Tip-Directed Synthesis of Multimetallic Nanoparticles. J. Am. Chem. Soc. 137, 9167-9173 (2015).

13. P.-C. Chen et al., Structural Evolution of Three-Component Nanoparticles in Polymer Nanoreactors. *J. Am. Chem. Soc.* 139, 9876-9884 (2017).
14. S. Ranganathan, Alloyed pleasures: Multiatomic cocktails. *Curr. Sci.* 85, 1404-1406 (2003).
15. J.-W. Yeh et al., Nanostructured High-Entropy Alloys with Multiple Principal Elements: Novel Alloy Design Concepts and Outcomes. *Adv. Eng. Mater.* 6, 299-303 (2004).
16. B. S. Murty, J.-W. Yeh, S. Ranganathan, *High-entropy alloys* (Butterworth-Heinemann, 2014).
17. Z. Li, K. G. Pradeep, Y. Deng, D. Raabe, C. C. Tasan, Metastable high-entropy dual-phase alloys overcome the strength-ductility trade-off. *Nature.* 534, 227 (2016).
18. Y. F. Ye, Q. Wang, J. Lu, C. T. Liu, Y. Yang, High-entropy alloy: challenges and prospects. *Mater. Today.* 19, 349-362 (2016).
19. D. C. Hofmann et al., Designing metallic glass matrix composites with high toughness and tensile ductility. *Nature.* 451, 1085-1089 (2008).
20. D. A. Porter, K. E. Easterling, M. Y. Sherif, *Phase Transformations in Metals and Alloys* (CRC Press, Third Edit., 2009).
21. Y. Yao et al, *Carbo-thermal shock synthesis of high-entropy-alloy nanoparticles. Science* 30 Mar. 2018: Vol. 359, Issue 6383, pp. 1489-1494 DOI: 10.1126/science.aan5412
22. N. Eustathopoulos, M. G. Nicholas, B. B. Drevet, *Wettability at high temperatures* (Elsevier, 1999), vol. 3.
23. M. Lukas et al., Catalytic subsurface etching of nanoscale channels in graphite. *Nat. Commun.* 4, 1379 (2013).
24. F. Tao et al., Reaction-Driven Restructuring of Rh—Pd and Pt—Pd Core-Shell Nanoparticles. *Science* 322, 932-934 (2008).
25. M. A. Newton, C. Belver-Coldeira, A. Martinez-Arias, M. Fernandez-Garcia, Dynamic in situ observation of rapid size and shape change of supported Pd nanoparticles during CO/NO cycling. *Nat. Mater.* 6, 528-532 (2007).
26. F. Tao et al., Break-Up of Stepped Platinum Catalyst Surfaces by High CO Coverage. *Science* 327, 850-853 (2010).
27. P.-H. Lu et al., Highly Deformable and Mobile Palladium Nanocrystals as Efficient Carbon Scavengers. arXiv: 1802.00207 [physics. app-ph].
28. N. Combe, P. Jensen, A. Pimpinelli, Changing shapes in the nanoworld. *Phys. Rev. Lett.* 85, 110-113 (2000).
29. C. C. Wang et al., Ultrafast shape change and joining of small-volume materials using nanoscale electrical discharge. *Nano Res.* 8, 2143-2151 (2015).
30. D.-G. Xie et al., In situ study of the initiation of hydrogen bubbles at the aluminium metal/oxide interface. *Nat. Mater.* 14, 899-903 (2015).
31. D. Wang, Y. Li, One-Pot Protocol for Au-Based Hybrid Magnetic Nanostructures via a Noble-Metal-Induced Reduction Process. *J. Am. Chem. Soc.* 132, 6280-6281 (2010).
32. D. M. Considine, *Chemical and process technology encyclopedia* (CRC press, 1974).
33. L. Xin, H. Yongqiang, J. Husheng, Pt—Rh—Pd Alloy Group Gauze Catalysts Used for Ammonia Oxidation. *Rare Met. Mater. Eng.* 46, 339-343 (2017).
34. P. A. J. Bagot et al., Oxidation and Surface Segregation Behavior of a Pt—Pd—Rh Alloy Catalyst. *J. Phys. Chem. C.* 118, 26130-26138 (2014).
35. B. V. I. Chernyshov, I. M. Kisil, Platinum Metals Catalytic Systems in Nitric Acid Production. *Platin. Met. Rev.* 37, 136-143 (1993).
36. X. Hu, Y. Ning, L. Chen, Q. Shi, C. Jia, Physical Properties and Application Performance of Platinum-Palladium-Rhodium Alloys Modified with Cerium. *Platin. Met. Rev.* 56, 40-46 (2012).
37. L. Bu et al., Biaxially strained PtPb/Pt core/shell nanoplate boosts oxygen reduction catalysis. *Science* 354, 1410-1414 (2016).
38. C. B. Alcock, V. P. Itkin, M. K. Horrigan, Vapour pressure equations for the metallic elements: 298—2500K. *Can. Metall. Q.* 23, 309-313 (1984).
39. H. W. Kim et al., Selective Gas Transport Through Few-Layered Graphene and Graphene Oxide Membranes. *Science* 342, 91-95 (2013).
40. L. S. Lobo, S. A. C. Carabineiro, Kinetics and mechanism of catalytic carbon gasification. *Fuel.* 183, 457-469 (2016).
41. B. L. Farrell, V. O. Igenegbai, S. Linic, A viewpoint on direct methane conversion to ethane and ethylene using oxidative coupling on solid catalysts. *ACS Catal.* 6, 4340-4346 (2016).
42. U. Zavyalova, M. Holena, R. Schlogl, M. Baerns, Statistical analysis of past catalytic data on oxidative methane coupling for new insights into the composition of high-performance catalysts. *ChemCatChem.* 3, 1935-1947 (2011).
43. B. H.-Y. Chen, H.-L. R. Chang, Development of low temperature three-way catalysts for future fuel efficient vehicles. *Johnson Matthey Technol. Rev.* 59, 64-67 (2015).
44. G. Liu, P.-X. Gao, A review of NOx storage/reduction catalysts: mechanism, materials and degradation studies. *Catal. Sci. Technol.* 1, 552-568 (2011).
45. C. Carrillo et al., Designing Catalysts for Meeting the DOE 150° C. Challenge for Exhaust Emissions. *Microsc. Microanal.* 23, 2028-2029 (2017).
46. J. Perez-Ramirez, E. V. Kondratenko, G. Novell-Leruth, J. M. Ricart, Mechanism of ammonia oxidation over PGM (Pt, Pd, Rh) wires by temporal analysis of products and density functional theory. *J. Catal.* 261, 217-223 (2009).
47. J. Perez-Ramirez, B. Vigeland, Perovskite membranes in ammonia oxidation: Towards process intensification in nitric acid manufacture. *Angew. Chemie—Int. Ed.* 44, 1112-1115 (2005).
48. E. F. Sutormina et al., Effect of the Reaction Medium on the Physicochemical Properties of the Oxide Monolith Catalyst IK-42-1 for Ammonia Oxidation. *Kinet. Catal.* 50, 892-898 (2009).
49. D. I. Mendeleev (1869) as current (2018) "Periodic Table of the Elements", American Chemical Society.

What is claimed is:

1. A system comprising:
a heating chamber configured to apply a thermal shock to one or more solution-based salt precursors by heating at a first temperature for a first time and subsequently quenching at a cooling rate, the heating chamber comprising one or more Joule heating elements, each Joule heating element being formed of conductive carbon, the conductive carbon comprising carbon nanofibers;
a container storing the one or more solution-based salt precursors and configured to apply a coating of the one or more solution-based salt precursors on a substrate prior to the heating chamber; and a controller operatively coupled to the heating chamber and configured to control operation thereof to apply the thermal shock to the one or more solution-based salt precursors,
wherein the controller is configured to control the heating chamber such that:
the first temperature of the thermal shock is in a range of 500-3000 K,
the first time is in a range of 1 millisecond to 1 minute, and
the cooling rate is in a range of 10 K/s to $10^6$ K/s.

2. The system of claim 1, wherein the heating chamber is a heating vessel having an inlet portion for receiving the one or more solution-based salt precursors and an outlet portion for conveying particles resulting from the thermal shock.

3. The system of claim 1, wherein the controller is configured to control the heating chamber such that the first time is in a range of 5 milliseconds to 55 milliseconds.

4. The system of claim 1, wherein the controller is configured to control the heating chamber such that the heating chamber is heated at a heating rate to the first temperature prior to the first time, and the heating rate is in a range of 10 K/s to $10^6$ K/s.

5. The system of claim 1, wherein an interior of the heating chamber comprises a vacuum.

6. The system of claim 1, wherein an interior of the heating chamber comprises an inert atmosphere or reactive atmosphere.

7. The system of claim 1, wherein the controller is configured to control the heating chamber such that:
the first temperature of the thermal shock is in a range of 1500-3000 K, and
the first time is in a range of 1 millisecond to 1 second.

8. A system comprising:
a heating chamber configured to apply a thermal shock to one or more solution-based salt precursors by heating at a first temperature for a first time and subsequently quenching at a cooling rate;
a first storage roll from which a continuous substrate is dispensed;
a first container storing the one or more solution-based salt precursors therein; and
a controller operatively coupled to the heating chamber and configured to control operation thereof to apply the thermal shock to the one or more solution-based salt precursors,
wherein the controller is configured to control the heating chamber such that:
the first temperature of the thermal shock is in a range of 500-3000 K,
the first time is in a range of 1 millisecond to 1 minute, and
the cooling rate is in a range of 10 K/s to $10^6$ K/s, and
consecutive portions of the continuous substrate are conveyed from the first storage roll to the first container prior to the heating chamber so as to deposit the one or more solution-based salt precursors on respective surfaces of the consecutive portions of the continuous substrate.

9. The system of claim 8, further comprising:
a drying vessel configured to reduce moisture content of the substrate and the one or more solution-based salt precursors thereon.

10. The system of claim 8, wherein the controller is configured to control the heating chamber such that:
the first temperature of the thermal shock is in a range of 1500-3000 K, and
the first time is in a range of 1 millisecond to 1 second.

11. The system of claim 8, wherein the controller is configured to control the heating chamber such that the heating chamber is heated at a heating rate to the first temperature prior to the first time, and the heating rate is in a range of 10 K/s to $10^6$ K/s.

12. The system of claim 8, wherein the heating chamber comprises one or more Joule heating elements, each Joule heating element being formed of conductive carbon.

13. The system of claim 8, further comprising a second storage roll onto which the consecutive portions of the continuous substrate from the heating chamber are collected, the consecutive portions of the continuous substrate from the heating chamber having nanoparticle formed thereon.

14. A system comprising:
a heating chamber configured to apply a thermal shock to one or more precursors by heating at a first temperature for a first time and subsequently quenching at a cooling rate;
a substrate constructed to have the one or more precursors disposed thereon and configured to move through the heating chamber with the one or more precursors disposed thereon; and
a controller operatively coupled to the heating chamber and the substrate, the controller being configured to control operation of the heating chamber and the substrate to apply the thermal shock to the one or more precursors,
wherein the controller is configured to control the heating chamber such that:
the first temperature of the thermal shock is in a range of 500-3000 K,
the first time is in a range of 1 millisecond to 1 minute, and
the cooling rate is in a range of 10 K/s to $10^6$ K/s, and
the controller is further configured to control movement of the substrate such that quenching of the thermal shock is performed by moving the substrate from the heating chamber.

15. The system of claim 14, wherein the controller is configured to control the heating chamber such that:
the first temperature of the thermal shock is in a range of 1500-3000 K, and
the first time is in a range of 1 millisecond to 1 second.

16. The system of claim 14, wherein the controller is configured to control the heating chamber such that the heating chamber is heated at a heating rate to the first temperature prior to the first time, and the heating rate is in a range of 10 K/s to $10^6$ K/s.

17. The system of claim 14, wherein the heating chamber comprises one or more Joule heating elements, each Joule heating element being formed of conductive carbon.

18. The system of claim 14, wherein the substrate is formed of carbon or oxygenated carbon.

* * * * *